US012671191B2

(12) United States Patent
Kamor et al.

(10) Patent No.: US 12,671,191 B2
(45) Date of Patent: Jun. 30, 2026

(54) WIRE TERMINALS AND METHOD OF USES

(71) Applicant: Leviton Manufacturing Co., Inc., Melville, NY (US)

(72) Inventors: Michael Kamor, North Massapequa, NY (US); Ronald Jansen, Ridgewood, NY (US); Kelly Tyler, Levittown, NY (US); Nicholas Pilato, Forest Hills, NY (US); Stephen Aaron, East Patchogue, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 279 days.

(21) Appl. No.: 18/036,060

(22) PCT Filed: Jan. 24, 2023

(86) PCT No.: PCT/US2023/011392

§ 371 (c)(1),
(2) Date: May 9, 2023

(87) PCT Pub. No.: WO2023/154176

PCT Pub. Date: Aug. 17, 2023

(65) Prior Publication Data

US 2024/0356248 A1 Oct. 24, 2024

Related U.S. Application Data

(60) Provisional application No. 63/308,124, filed on Feb. 9, 2022.

(51) Int. Cl.

| | |
|---|---|
| ***H01R 9/24*** | (2006.01) |
| ***H01R 4/48*** | (2006.01) |
| ***H01R 25/00*** | (2006.01) |

(52) U.S. Cl.

CPC ......... *H01R 9/2491* (2013.01); *H01R 4/4816* (2023.08); *H01R 4/483* (2023.08); *H01R 25/006* (2013.01)

(58) Field of Classification Search

CPC .. H01R 9/2691; H01R 4/4821; H01R 4/4816; H01R 4/483; H01R 9/2491; H01R 25/006

(Continued)

(56) References Cited

U.S. PATENT DOCUMENTS 4,759,726 A 7/1988 Naylor
6,250,950 B1 6/2001 Pallai (Continued)

FOREIGN PATENT DOCUMENTS

CN 111697357 A 9/2020
DE 102019116930 A1 12/2020

(Continued)

OTHER PUBLICATIONS

International Search Report and Written Opinion for International Application No. PCT/US 24/23075, dated Aug. 30, 2024, 12 pages.

(Continued)

*Primary Examiner* — Christopher M Koehler
*Assistant Examiner* — Gregory L Mangot
(74) *Attorney, Agent, or Firm* — KDW Firm PLLC

(57) ABSTRACT

The present disclosure relates to wire terminals and/or termination mechanisms arranged and configured for use with a wiring device. The wire terminals may be used in any suitable line-voltage wiring device. The wire terminals are arranged and configured to selectively receive a distal end of a wire therein.

32 Claims, 37 Drawing Sheets

(58) Field of Classification Search
USPC .......................................................... 439/816
See application file for complete search history.

(56) References Cited

U.S. PATENT DOCUMENTS

| | | | |
|---|---|---|---|
| 6,749,449 | B2 | 6/2004 | Mortun |
| 7,114,986 | B1 | 10/2006 | Toly |
| 7,909,664 | B2 | 3/2011 | Ilkhanov |
| 7,963,812 | B2 | 6/2011 | Ilkhanov |
| 8,047,883 | B2 | 11/2011 | Montalbano |
| 8,137,145 | B2 | 3/2012 | Joy |
| 8,475,191 | B2 | 7/2013 | Schafmeister |
| 9,124,034 | B2 | 9/2015 | Kollmann |
| 9,413,082 | B2 | 8/2016 | Gassauer |
| 9,466,895 | B2 | 10/2016 | Kollmann |
| 9,502,790 | B2 | 11/2016 | Kollmann |
| 10,230,179 | B2 | 3/2019 | Wilinski |
| 10,418,727 | B1 | 9/2019 | Wu |
| 10,461,444 | B2 | 10/2019 | Scanzillo et al. |
| 11,495,895 | B2 | 11/2022 | Scanzillo et al. |
| 11,705,667 | B2 | 7/2023 | Moser |
| 2002/0067582 | A1 | 6/2002 | Germain |
| 2002/0135958 | A1 | 9/2002 | Germain |
| 2005/0030685 | A1 | 2/2005 | DiSalvo |
| 2006/0279886 | A1 | 12/2006 | Huang |
| 2007/0041134 | A1 | 2/2007 | Huang |
| 2007/0066143 | A1 | 3/2007 | Lin et al. |
| 2010/0003865 | A1 | 1/2010 | Alderson |
| 2010/0304596 | A1 | 12/2010 | Ilkhanov |
| 2011/0130015 | A1 | 6/2011 | Lacey |
| 2011/0279933 | A1 | 11/2011 | Campolo |
| 2013/0005175 | A1* | 1/2013 | Rineau ................. H01R 4/2408 439/391 |
| 2013/0157520 | A1 | 6/2013 | Koellmann |
| 2015/0357727 | A1* | 12/2015 | Gassauer ............. H01R 4/4816 439/751 |
| 2015/0372402 | A1 | 12/2015 | Kollmann |
| 2016/0020543 | A1 | 1/2016 | Tedeschi |
| 2016/0190713 | A1 | 6/2016 | Wu et al. |
| 2018/0331438 | A1 | 11/2018 | Moser |
| 2020/0350706 | A1 | 11/2020 | Scanzillo |
| 2021/0083409 | A1 | 3/2021 | Hartmann |
| 2022/0294130 | A1 | 9/2022 | Ding |
| 2023/0024505 | A1 | 1/2023 | Scanzillo |
| 2023/0036314 | A1 | 2/2023 | Scanzillo |
| 2023/0327377 | A1 | 10/2023 | Scanzillo |

FOREIGN PATENT DOCUMENTS

| | | | |
|---|---|---|---|
| DE | 102020104140 | A1 | 8/2021 |
| DE | 102020118578 | A1 | 1/2022 |
| EP | 2096714 | A1 | 9/2009 |
| EP | 2355249 | A1 | 8/2011 |
| EP | 1956684 | B1 | 7/2013 |
| WO | 2014191676 | A1 | 12/2014 |

OTHER PUBLICATIONS

Logic Plus™ Rapid Fix, MK by Honeywell® Brochure, Aug. 4, 2021—4 pages.

International Search Report and Written Opinion for the International Patent Application No. PCT/US2023/011397, mailed May 4, 2023, 18 pages.

International Search Report and Written Opinion for the International Patent Application No. PCT/US2023/011392, mailed May 4, 2023, 16 pages.

International Search Report and Written Opinion for International Application No. PCT/US2025/025714, filing date Apr. 22, 2025, 12 pages.

* cited by examiner

WIRE TERMINALS AND METHOD OF USES

CROSS-REFERENCE TO RELATED APPLICATIONS

This application is a national stage application claiming the benefit of and priority to International Application No. PCT/US2023/011392 entitled "WIRE TERMINALS AND METHOD OF USES" filed Jan. 24, 2023, which is a non-provisional of, and claims the benefit of the filing date of, U.S. Provisional Patent Application No. 63/308,124, filed Feb. 9, 2022, entitled "WIRE TERMINALS AND METHOD OF USES," the entirety of each application is incorporated by reference herein.

TECHNICAL FIELD

The present disclosure is directed to wiring devices and, more particularly, to wiring devices including improved wire terminals or termination mechanisms (terms used interchangeably herein without the intent to limit) and related methods of use thereof.

BACKGROUND

To route, install and otherwise use AC electrical power, manufacturers produce many different kinds of devices. These devices are referred to herein as wiring devices. Examples of wiring devices include electrical receptacles, switches, dimmers, sensors, ground/arc fault circuit interrupters, and fan speed controls. Wiring devices are connected to the AC electrical power via wires/conductors (the terms wire and conductor may be used hereinafter synonymously), which can include solid core conductors and/or stranded wire conductors. A wire includes (or is considered to be) a conductive path for carrying the AC electrical power.

Wiring devices typically include wire termination terminals for terminating wires. Terminal types typically found on wiring devices include sets of line and load terminals and/or ground terminals. Each set of line and/or load terminals typically comprise individual phase and neutral terminals. Together these terminals, depending on the mechanical configuration, may be wired using one or more of several different common termination mechanisms/techniques where the mechanical configuration of the termination mechanisms typically dictates the technique used.

One such termination mechanism/technique is commonly referred to as "side-wire" (or otherwise referred to as "wrap-wire"). To terminate a wire using a side-wire terminal, an end of the wire is initially stripped to expose at least a portion of the end of the wire and then this exposed portion is wrapped around a terminal screw. The terminal screw is then tightened causing the head of the screw to secure the exposed wire between the head of the screw and a metallic plate (e.g., a brass terminal).

Another type of wiring mechanism/technique is referred to as "back-wire" (otherwise also referred to as "clamp-wire"). Typically, in back-wire terminals a screw engages a metallic plate with a second metallic plate (the resulting arrangement forming in a clamp) to compress a wire therebetween. In such a back-wire termination mechanism, a first metallic plate typically has a threaded opening and forms the clamp arrangement with a second metallic plate that has a non-threaded opening sized large enough to allow this second metallic plate to slide along the shaft of the screw between the first metallic plate and the head of the screw. Placing an exposed end of a stripped wire between the two metallic plates and tightening the screw results in the wire being removably secured between the two plates.

Another type of wire terminal mechanism/technique is referred to as "push in". Push-in termination mechanisms typically comprise a small hole, or aperture, in the wiring device housing through which an exposed end of a stripped wire is inserted and removably secured within the wiring device with the cooperation of a retention mechanism. For example, an end of a solid wire is initially stripped to expose about five-eighths of an inch of the wire. The resultant exposed portion of the wire is then inserted through the hole and into engagement with the internal retention mechanism which removably secures the exposed end of the wire by, e.g., applying clamping pressure to the wire in order to maintain the wire in electrical contact with an internal conductive portion of the wiring device. The retention mechanism provides sufficient resistance to prevent the wire from being pulled out of the hole. Typically, to release the wire, a tool (e.g., a screwdriver) is used to engage a releasing mechanism to release the wire.

Wiring devices usually also include a ground terminal that typically uses a wrap-wire/side-wire arrangement, as described above; e.g., a metallic plate that includes a threaded opening for receiving a ground terminal screw. Grounded wiring devices could also employ a conductive strap, or frame, that may be used in conjunction with a ground terminal screw for grounding the device. Wiring devices that use such a ground terminal screw in a side-wire/wrap-wire configuration would be wired as discussed above using an exposed portion of the ground wire.

It is desirable for wiring devices to incorporate wire terminals that are easier to use and that facilitate quicker installation as well as providing reliable and secure wire retention. Accordingly, there remains a need for improved wire terminals. It is with this in mind that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein is a wiring device. In one embodiment, the wiring device includes a housing and an electrical contact disposed at least partially within the housing, the electrical contact arranged and configured to accept a plug blade, and a wire terminal arranged and configured to secure a line-voltage electrical wire to the electrical contact.

In one embodiment, the wire terminal includes a lever, a first spring, and a biasing element. The lever is arranged and configured to move between a first position and a second position. The first spring is positioned adjacent to the electrical contact, the first spring defines an electrical wire receiving space. The biasing element is arranged and configured to apply a force onto the lever to maintain the lever in the first position. In the second position, the lever engages the first spring to enlarge the electrical wire receiving space to receive the electrical wire. In the first position, the first spring biases the electrical wire against the electrical contact to securely retain the electrical wire within the electrical wire receiving space and in contact with the electrical contact.

In one embodiment, the biasing element is a biasing spring.

In one embodiment, the biasing spring is arranged and configured to contact a portion of the lever such that a biasing force is applied to the lever to bias the lever to the first position.

In one embodiment, the biasing spring includes a first segment, a second segment, and a third segment, the second segment coupling the first segment to the third segment, the biasing spring defining a space between the first and third segments.

In one embodiment, a portion of the first segment is arranged and configured to contact the lever.

In one embodiment, the biasing element is a longitudinal pin operatively coupled to the lever to bias the lever to the first position.

In one embodiment, the lever includes a groove sized and configured to engage an intermediate portion of the pin.

In one embodiment, the wiring device further includes a secondary retention element arranged and configured to contact a portion of the electrical wire near a free end of the electrical wire once the electrical wire has been inserted into the housing.

In one embodiment, the secondary retention element contacts an insulated portion of the electrical wire near the free end of the electrical wire once the electrical wire has been inserted into the housing.

In one embodiment, the secondary retention element comprises a flexible clip positioned proximate an aperture formed in a rear surface of the housing, the flexible clip being arranged and configured to flex to enable the electrical wire to be inserted into the aperture formed in the rear surface of the housing, the clip being arranged and configured to grip the electrical wire to at least partially secure the electrical wire within the housing.

In one embodiment, the flexible clip includes first and second segments positioned on diametric sides of the aperture formed in the rear surface of the housing, the first and second segments being arranged and configured to exert a compressive force against the electrical wire.

In one embodiment, the first and second segments of the flexible clip exert a compressive force against an insulated portion of the electrical wire.

In one embodiment, the secondary retention element comprises a collar positioned proximate an aperture formed in a rear surface of the housing, the collar including first and second segments hingeably coupled to each other, the first and second segments movable between a first position and a second position, the second position including an increased diameter to facilitate insertion of the electrical wire, the first and second segments compressing against the electrical wire in the first position.

In one embodiment, movement of the lever from the second position to the first position moves the collar from its second position to its first position.

In one embodiment, the secondary retention element comprises a plate moveable between a first position and a second position, the plate positioned proximate an aperture formed in a rear surface of the housing, the plate including an opening therein, in the second position, the opening formed in the plate is aligned with the aperture formed in the rear surface of the housing to enable the electrical wire to be inserted therethrough, in the first position, the opening in the plate is moved relative to the aperture in the rear surface of the housing to hold the electrical wire within the housing.

In one embodiment, the plate is coupled to the lever so that movement of the lever from the second position to the first position moves the plate from its second position to its first position.

In one embodiment, the lever is pivotable between the first and second positions.

In one embodiment, the first spring includes a sharp edge arranged and configured to contact the electrical wire to provide additional retention force in maintaining the electrical wire in the electrical wire receiving space.

In one embodiment, the first spring includes a first leg, a second leg, and a third leg, the first leg including an aperture formed therein, a portion of the third leg being positioned within the aperture formed in the first leg.

In one embodiment, the second leg couples an end of the first leg to an end of the third leg.

In one embodiment, in use, movement of the lever from the first position to the second position applies a force onto the first spring causing the first and second legs to move relative to the third leg resulting in the electrical wire receiving space increasing in size.

In one embodiment, the electrical wire receiving space is defined by a wire contacting surface formed along the aperture of the first arm and a wire facing surface of the third arm.

In one embodiment, the aperture formed in the first leg of the first spring is positioned adjacent to an aperture formed in a rear surface of the housing.

In one embodiment, the lever includes a bearing surface, movement of the lever from the first position to the second position causes the bearing surface formed on the lever to contact the first leg of the first spring, which moves the first leg of the first spring relative to the third leg of the first spring thereby enlarging the electrical wire receiving space.

In one embodiment, the wiring device is a line-voltage wiring device arranged and configured to be inserted into a wall box.

In one embodiment, the line-voltage wiring device is selected from one of an electrical receptacle, ground fault circuit interrupters, and arc fault circuit interrupters.

In an alternate embodiment, a wiring device is disclosed. The wiring device including a housing, an electrical contact disposed at least partially within the housing, and a wire terminal arranged and configured to secure a line-voltage electrical wire to the electrical contact. The wire terminal including lever arranged and configured to move between a first position and a second position, a first spring positioned adjacent to the electrical contact, the first spring defining an electrical wire receiving space, and a biasing element arranged and configured to apply a force onto the lever to maintain the lever in the first position, wherein, in the second position, the lever engages the first spring to enlarge the electrical wire receiving space to receive the electrical wire, and, in the first position, the first spring biases the electrical wire against the electrical contact to securely retain the electrical wire within the electrical wire receiving space and in contact with the electrical contact.

In an alternate embodiment, a wiring device is disclosed. The wiring device including a housing, an electrical contact disposed at least partially within the housing, and a wire terminal arranged and configured to secure a line-voltage electrical wire to the electrical contact. The wire terminal including a lever arranged and configured to move between a first position and a second position, a first spring positioned adjacent to the electrical contact, the first spring defining an electrical wire receiving space, a biasing spring arranged and configured to apply a force onto the lever to maintain the lever in the first position, and a secondary retention element arranged and configured to contact a portion of the electrical wire near a free end of the electrical wire once the electrical wire has been inserted into the housing, wherein, in the second position, the lever engages the first spring to enlarge the electrical wire receiving space to receive the electrical wire, and, in the first position, the first spring biases the electrical wire against the electrical contact to securely retain the electrical wire within the electrical wire receiving space and in contact with the electrical contact.

BRIEF DESCRIPTION OF THE DRAWINGS

By way of example, a specific embodiment of the disclosed device will now be described, with reference to the accompanying drawings, in which.

Figure 1A:
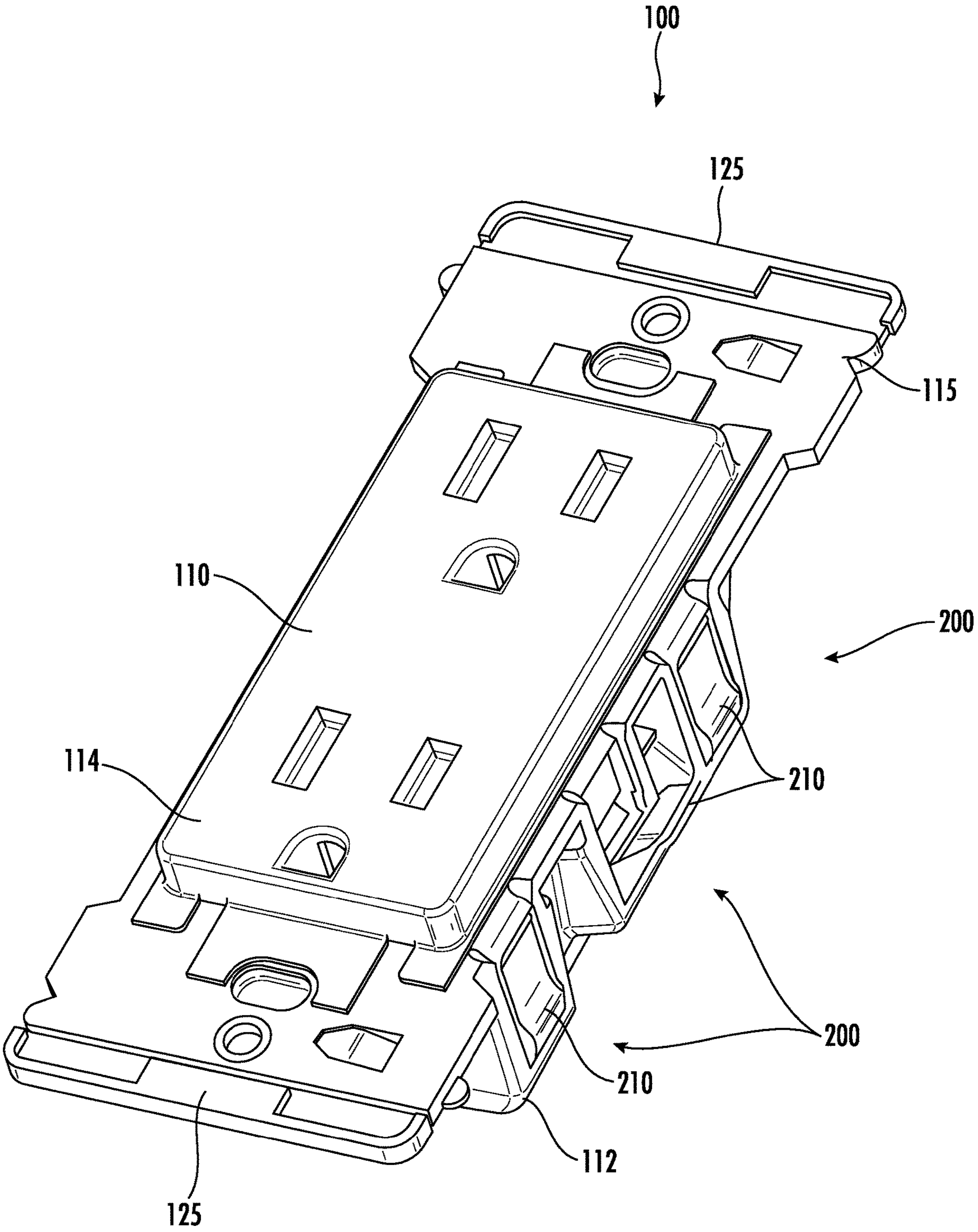
FIGS. 1A-1C illustrate various views of an embodiment of a wiring device in accordance with one or more features of the present disclosure.

It should be understood that the drawings are not necessarily to scale and that the disclosed embodiments are sometimes illustrated diagrammatically and in partial views. In certain instances, details which are not necessary for an understanding of the disclosed methods and devices or which render other details difficult to perceive may have been omitted. It should be further understood that this disclosure is not limited to the particular embodiments illustrated herein. In the drawings, like numbers refer to like elements throughout unless otherwise noted.

DETAILED DESCRIPTION

Various features or the like of a wire terminal or a wire termination mechanism (terms used interchangeable herein without the intent to limit or distinguish) and corresponding methods of use arranged and configured to enable a wire (e.g., an electrical wire) to be installed into a wiring device will now be described more fully hereinafter with reference to the accompanying drawings, in which one or more features of the wire terminals will be shown and described. It should be appreciated that the various features may be used independently of, or in combination, with each other. It will be appreciated that the various wire terminals as disclosed herein may be embodied in many different forms and should not be construed as being limited to the embodiments set forth herein. Rather, these embodiments are provided so that this disclosure will convey certain features of the wire terminals to those skilled in the art.

In accordance with one or more features of the present disclosure, various wire terminals arranged and configured to enable an installer to quickly and easily install, engage, couple, etc. (terms used interchangeably herein without the intent to limit or distinguish) one or more electrical wires to an electrical wiring device will be shown and described. As will be described herein, the wire terminals may be arranged and configured to enable an installer to quickly and easily install one or more electrical wires to an electrical wiring device without the need for any additional tools such as, for example, without the need for a screwdriver (e.g., the wire terminals are configured to allow a user to open and close a lever without the need for an excessive amount of force (i.e., without the need for a tool such as a screwdriver) allowing for tool-less wire termination). Rather, as will be described herein, various embodiments utilizing a lever and spring element (e.g., a clamp spring) to selectively engage the electrical wire to the wiring device (e.g., the wire terminals are arranged and configured to mechanically and electrically secure an electrical wire to an electrical contact) will be shown and described. In addition, in accordance with one or more features of the present disclosure, the wire terminal may incorporate a biasing element such as, for example, a biasing spring, to bias the lever to a first position (e.g., a biasing element arranged and configured to take up any play or slack in the lever due to, for example, insertion of the electrical wire). Thus arranged, in use, the biasing element or spring is arranged and configured to apply a force onto the lever to maintain the lever in the first position once the lever has moved a certain amount or percentage from the second position. Moreover, in accordance with one or more features of the present disclosure that may be used in combination with, or separate from the wire terminal, the wiring device may also include a retention element or mechanism (terms used interchangeably herein) arranged and configured to restrain a portion or a free end of the electrical wire once the electrical wire has entered the wiring device (e.g., to restrain a portion of the electrical wire within the housing).

Figure 1B:
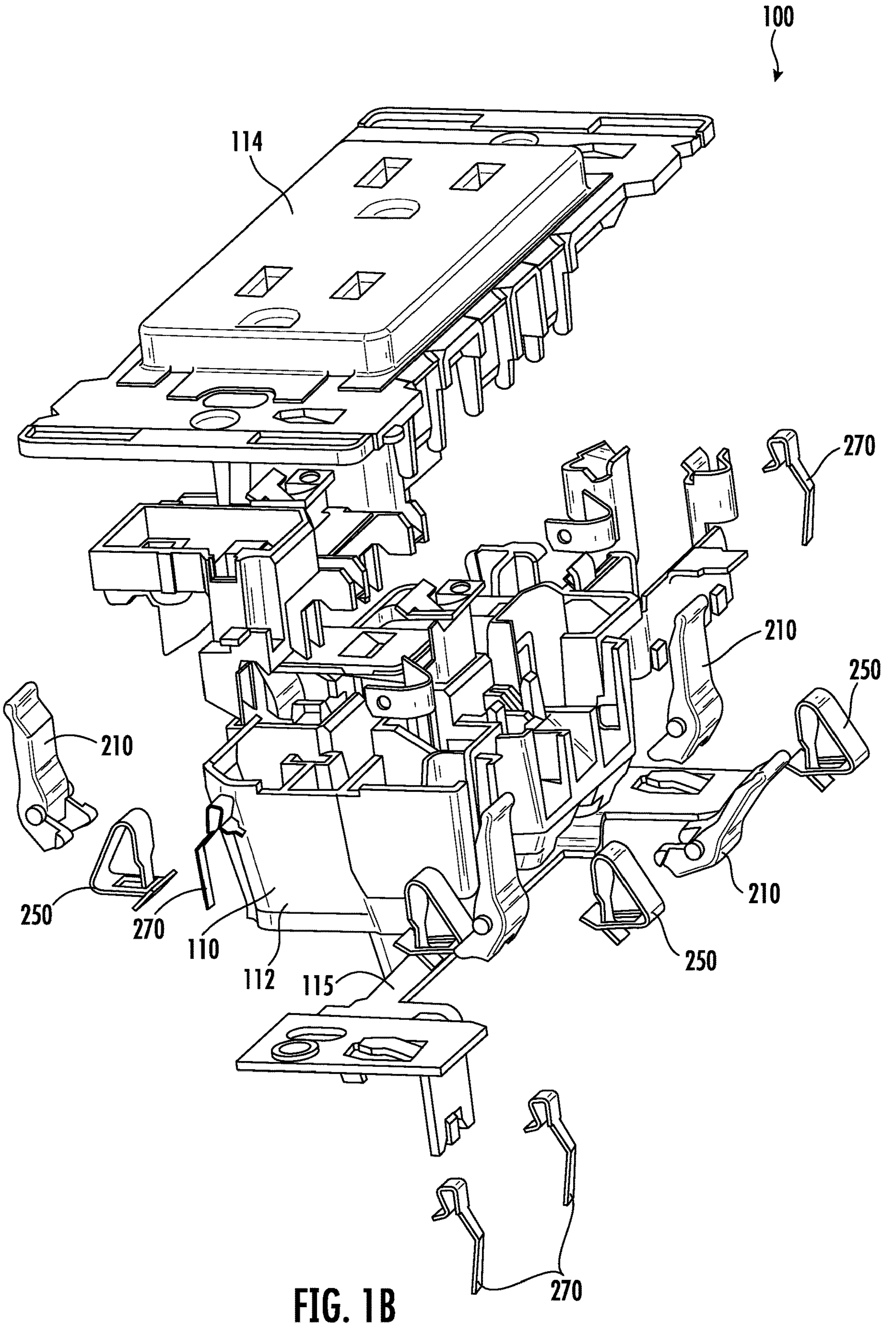
Figure 1C:
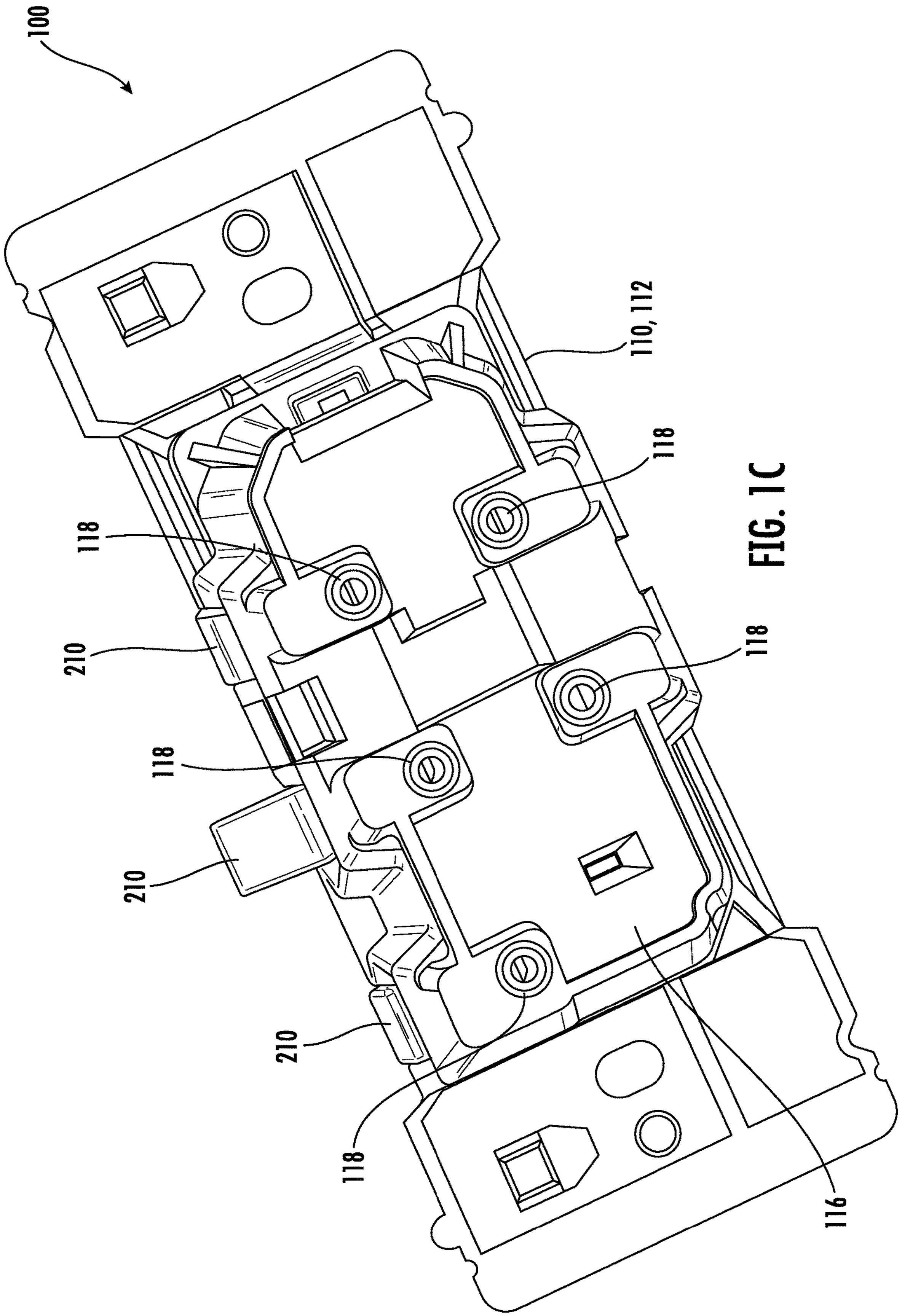

Referring to FIGS. 1A-1C, an example embodiment of a wiring device 100 in accordance with one or more features of the present disclosure is shown. As illustrated, in one embodiment, the wiring device 100 may be in the form of an electrical receptacle. However, it should be appreciated that the various wire terminals and/or the retention elements disclosed herein may be incorporated into any suitable wiring device arranged and configured to receive line-voltage, either now known or hereafter developed. For example, referring to FIGS. 2A and 2B, the wiring device 100 may be in the form of a switch. Alternative, the wiring device 100 may be in the form of, for example, a dimmer, a sensor, a ground/arc fault circuit interrupter, or a fan speed control. As such, it should be understood that the term “wiring device” is intended to include any of the standard line voltage electrical devices that are now known or hereafter developed. Line voltage refers to a voltage, typically Alternating Current (AC), that is supplied to buildings/residences (e.g., electric light and power), for example, 110 VAC, 115 VAC, 120 VAC, 125 VAC, 208 VAC, 220 VAC, 230 VAC, 240 VAC, single or multiphase. Line voltage devices are distinguished from low voltage devices, which refer to devices that receive a voltage which is less than a certain threshold (50 Volts for example, AC or DC). This reduced voltage is typically used for communication, signaling, data/multimedia transmission, low voltage charging, and the like. As such, the present disclosure should not be limited to any particular line voltage wiring device unless explicitly claimed. While the present disclosure describes and shows the wire terminals in combination with a line-voltage electrical device, it should be appreciated that the wire terminals may be used in connection with low-voltage electrical devices as well. Thus, the present disclosure should not be limited to line-voltage devices unless specifically claimed.

In use, as will be appreciated by one of ordinary skill in the art, the wiring device 100 may be fastened to an electrical box positioned within a wall or ceiling of a building or in other suitable location. In addition, as will be appreciated by one of ordinary skill in the art, the wiring device 100 is arranged and configured to be inserted into wall boxes whose size is dictated by National Electrical Manufacturers Association (“NEMA”). For example, a wiring device 100 may include a housing 110 wherein the wiring device 100 is sized and configured as a single gang wall box mounted device. In various embodiments, the wiring device 100 also includes a strap 115. The housing 110 may include rear and front cover portions 112, 114 that, when assembled, enclose a variety of components, although the housing may include more portions or fewer portions.

Figure 3A:
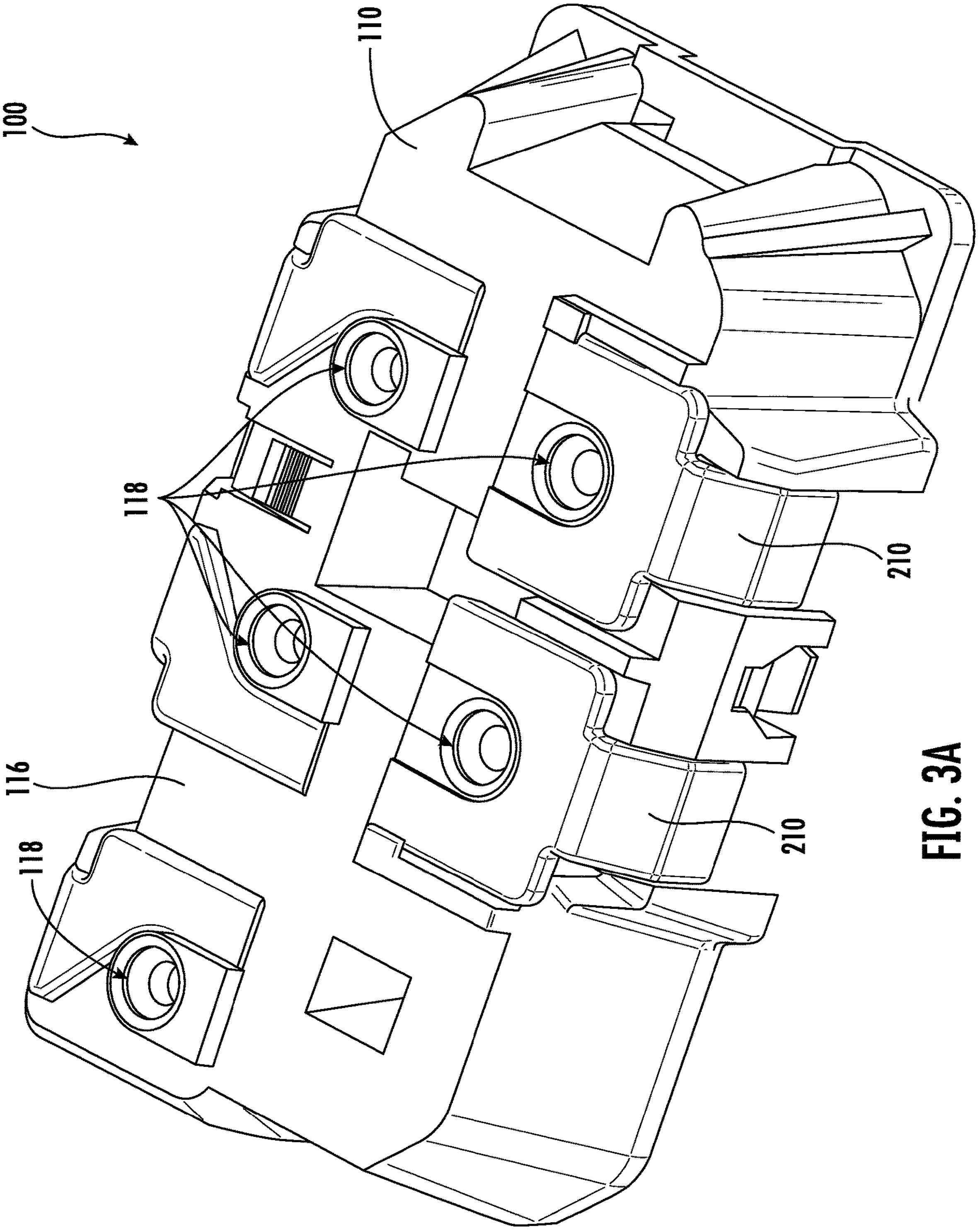
FIG. 3A illustrates a rear perspective view of a portion of an alternate embodiment of a wiring device in accordance with one or more features of the present disclosure.
Figure 3B:
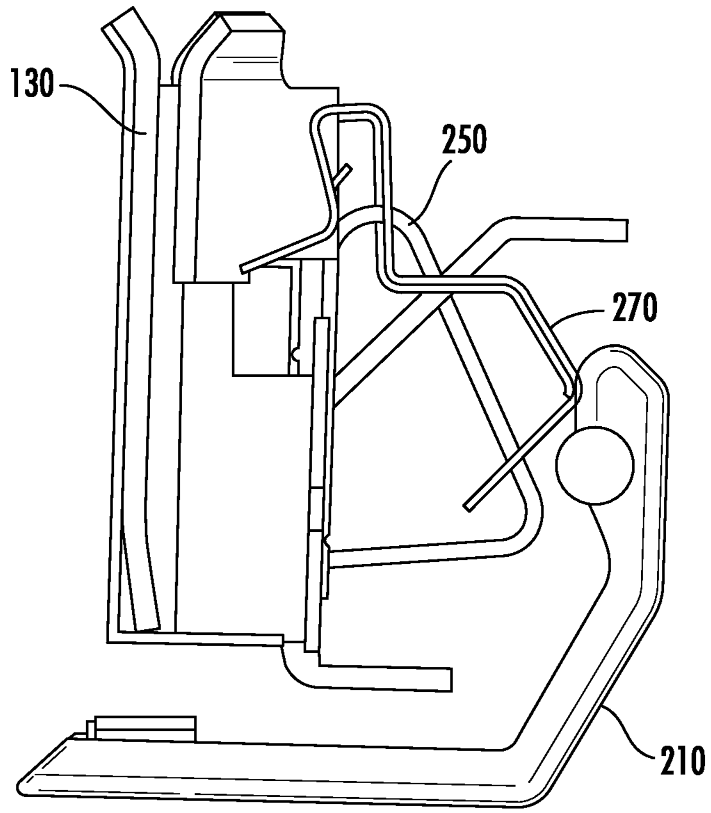
FIG. 3B illustrates a side, cross-sectional view of an embodiment of a wire terminal used in the wiring device shown in FIG. 3A (with the housing removed for clarity), the lever of the wire terminal being in the first position.
Figure 3C:
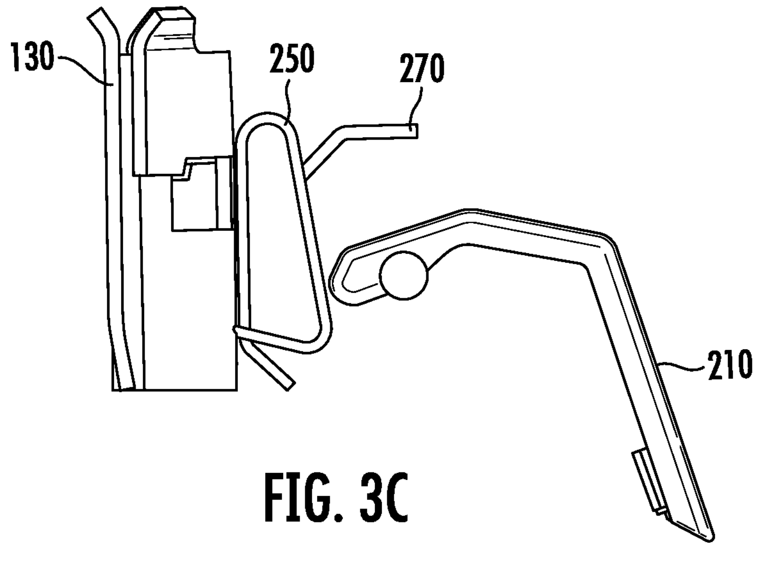
FIG. 3C illustrates a side, cross-sectional view of the wire terminal shown in FIG. 3B, the lever of the wire terminal being in the second position.
Figure 3D:
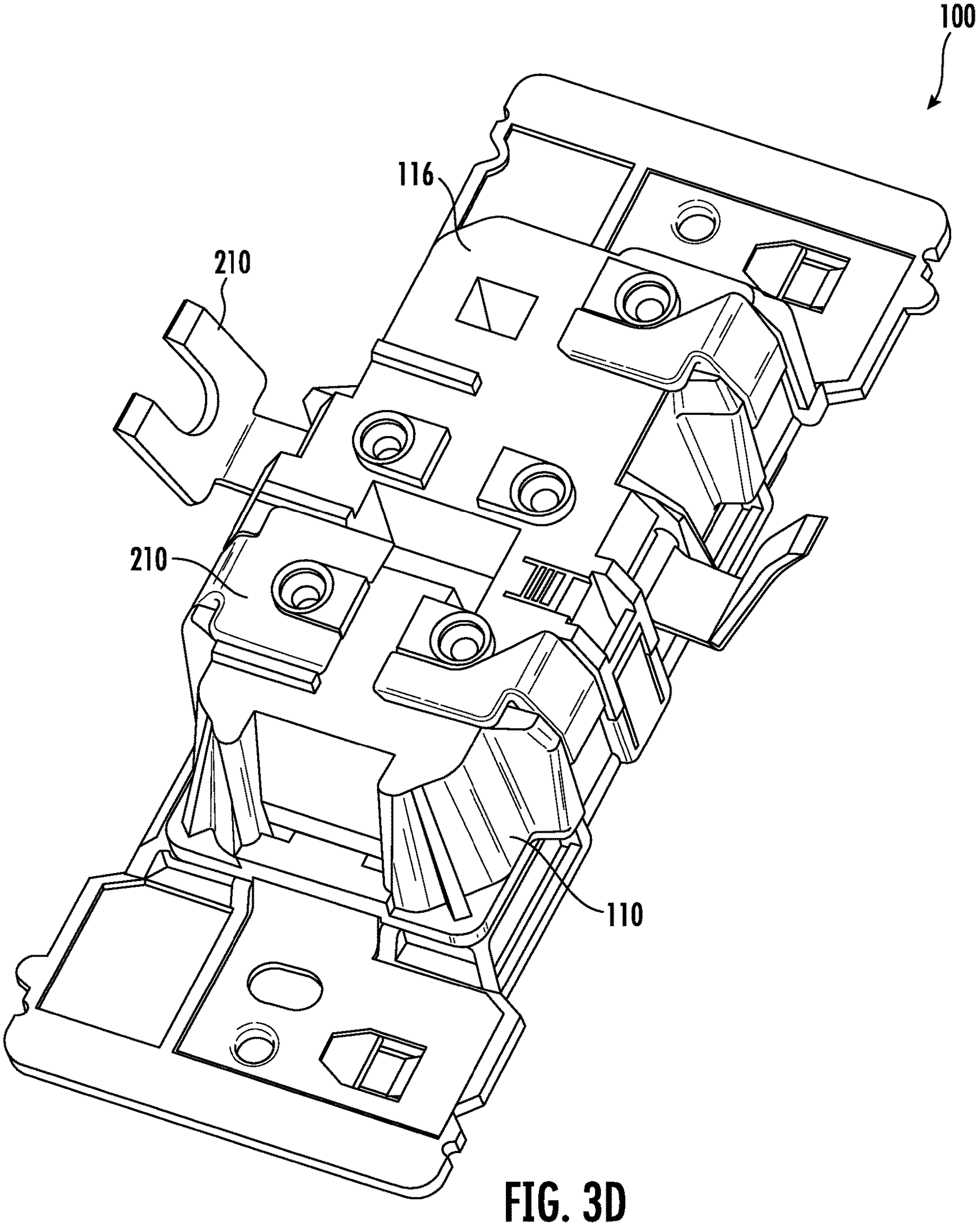
FIGS. 3D-3F illustrate various other views of the wire terminal used in the wiring device shown in FIG. 3A.
Figure 3E:
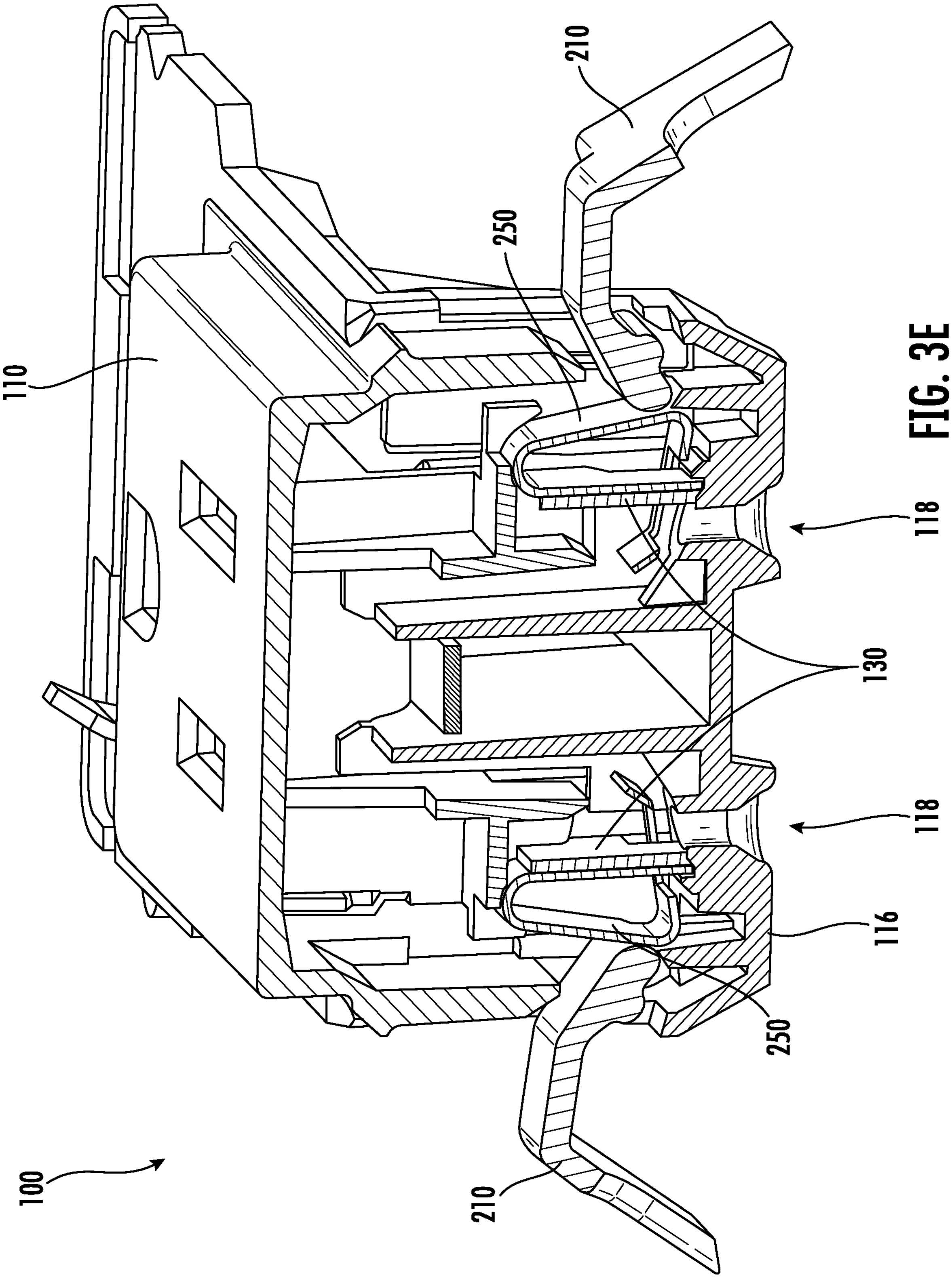
Figure 3F:
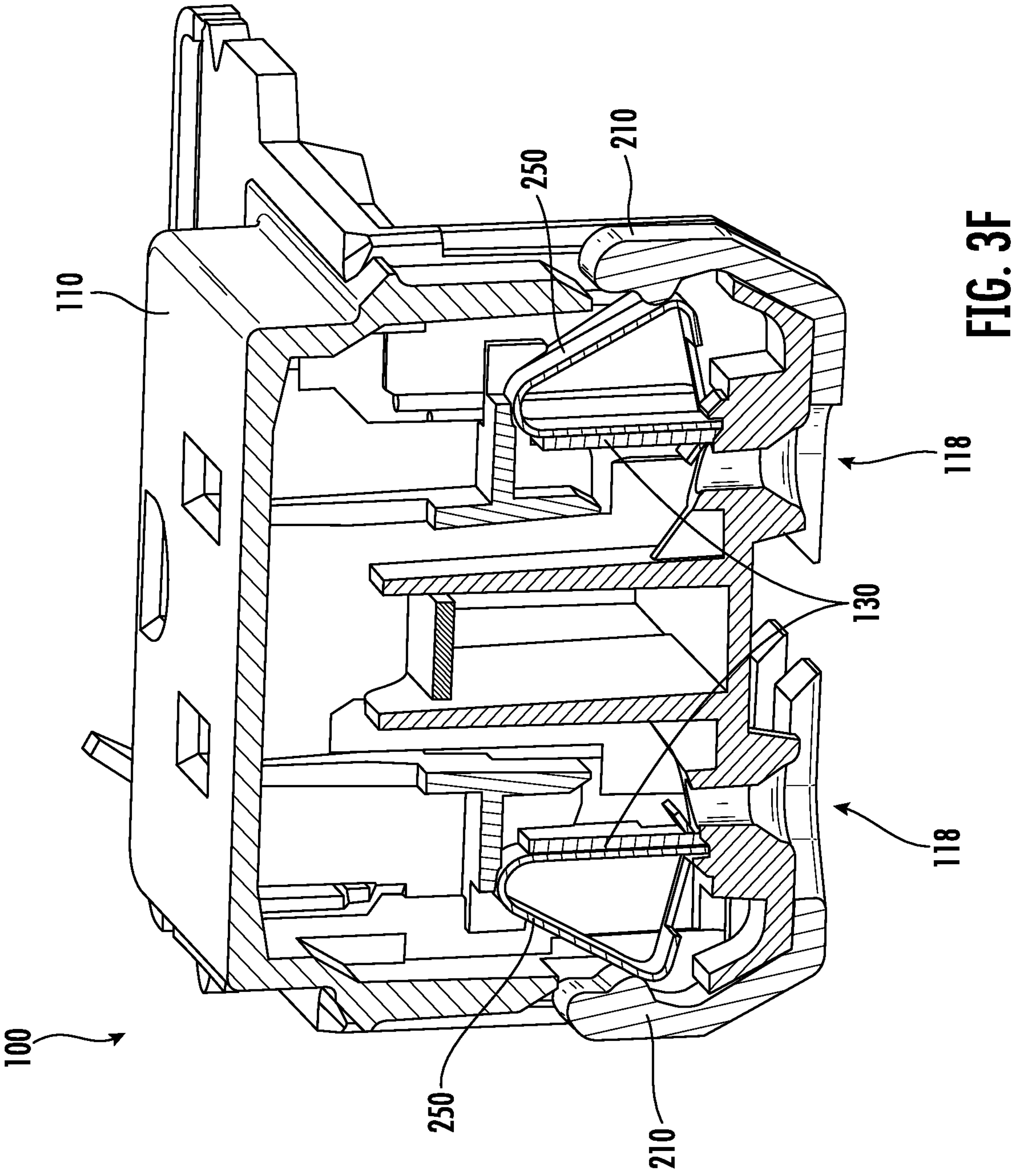

Moreover, as will be described in greater detail herein, each of the wiring device 100 includes one or more wire terminals 200, which may include a lever 210 movable between a first or closed position (terms used interchangeably herein) and a second or opened position (terms used interchangeably herein), a first spring element or lever assist spring (e.g., a clamp spring) 250 to selectively engage the electrical wire to the wiring device 100, and a secondary biasing element (e.g., a secondary biasing spring or lever assist spring) 270 to bias the lever 210 to the first position. As will be generally described and illustrated, in use, the levers 210 are arranged and configured to engage the housing 110 of the wiring device 100 at portions of the sides of the housing 110. However, this is but one configuration, and it is envisioned that the levers 210 may engage other portions of the wiring device 100. For example, with reference to FIGS. 3A-3F, the levers 210 may be coupled to the housing 110 at a portion of a rear surface 116 thereof. That is, as illustrated, in one embodiment, the levers 210 may be arranged and configured to wrap around the rear surface 116 of the housing 110 when in the first position such that a portion of the levers 210 stop or rest on the rear surface 116 of the housing 110 in the first position. In one embodiment, each lever 210 may be manufactured as a monolithic lever. In use, the user may engage the rear end portion of the lever 210 and using, for example, a fingernail, grip and pull back on the lever 210 thereby opening and/or enlarging the electrical wire receiving space S. Thus arranged, during installation of the wiring device 100 into the wall box, the configuration of the levers assists in keeping the levers in the first position. As will be described in greater detail below, the lever 210 is moved between the first position (FIGS. 3B and 3F) and the second position (FIGS. 3C and 3E). In the first position (FIGS. 3B and 3F), the lever 210 biases the clamp spring 250 towards the contact 130, the secondary biasing spring 270 applies a force to assist with maintaining the lever 210 in the first position. In the second position (FIGS. 3C and 3E), the lever 210 is positioned away from the clamp spring 250 thereby enlarging the electrical wire receiving space S to receive the electrical wire.

Figure 6A:
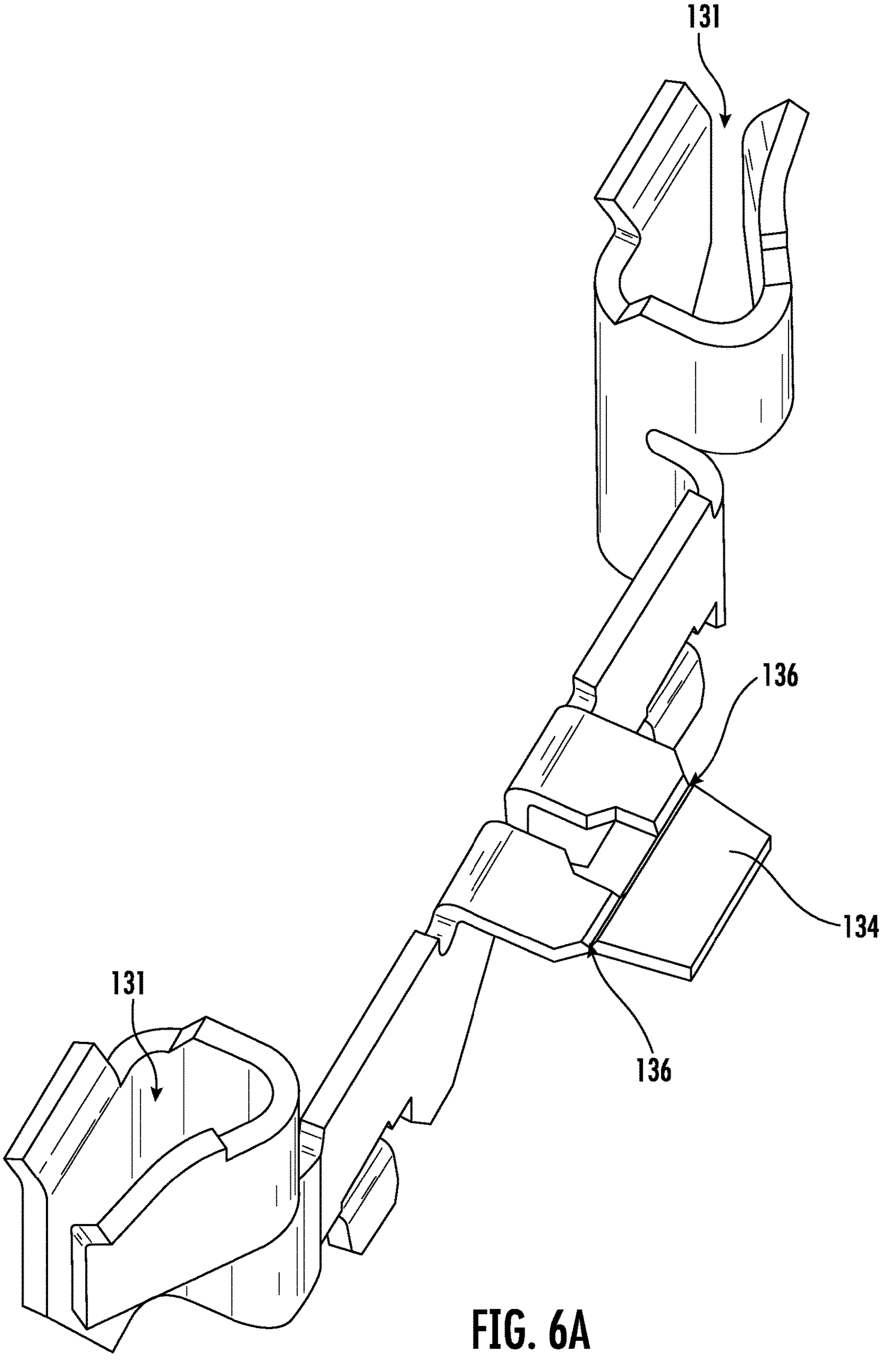
FIG. 6A illustrates a perspective view of an embodiment of a contact that may be used in combination with the wire terminal shown in FIGS. 4 and 5.
Figure 6B:
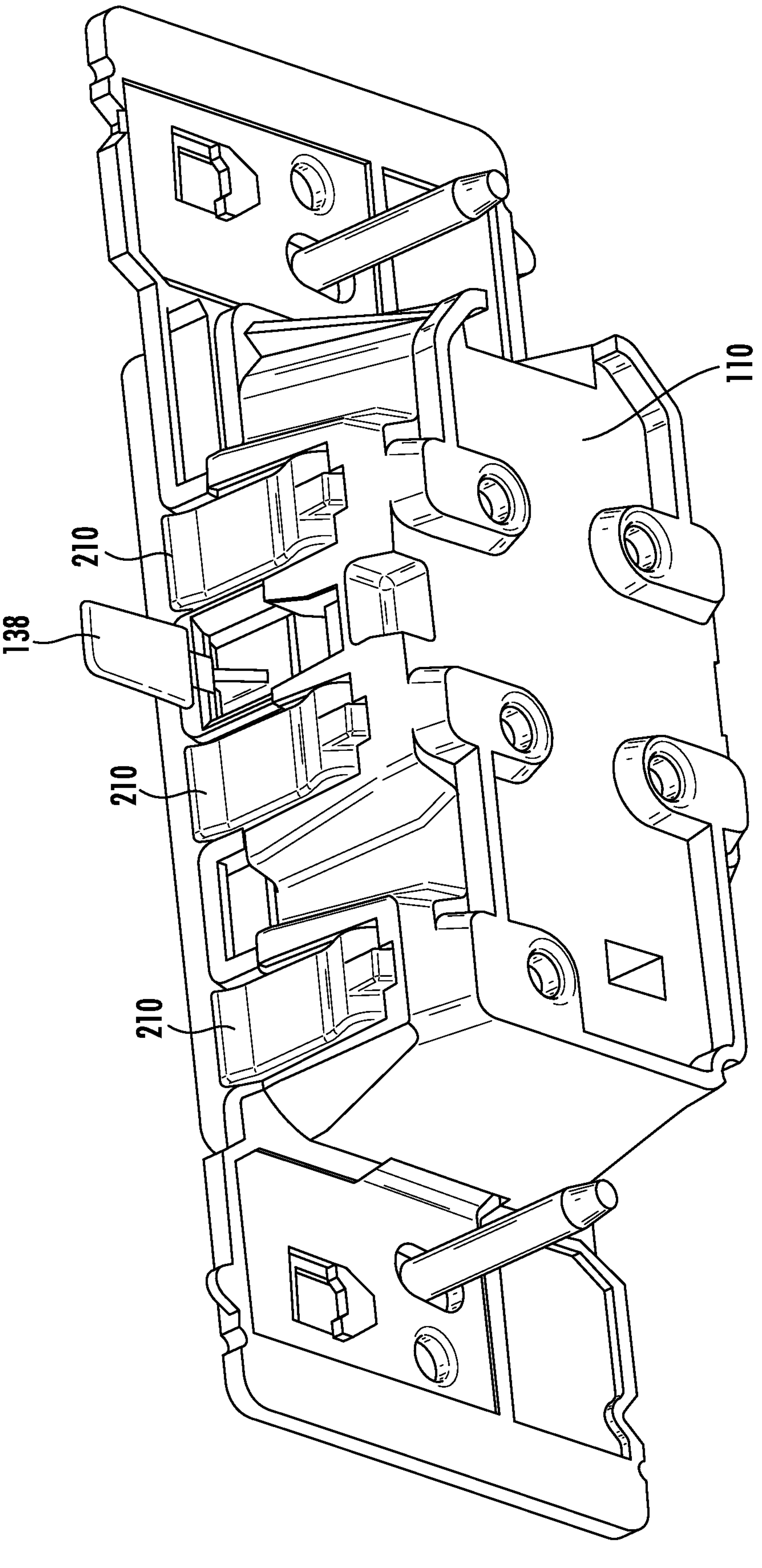
FIGS. 6B-6D illustrate various views of an embodiment of a configurable portion that may be incorporated into a wiring device to enable access to a contact break off tab in accordance with one or more features of the present disclosure.
Figure 6C:
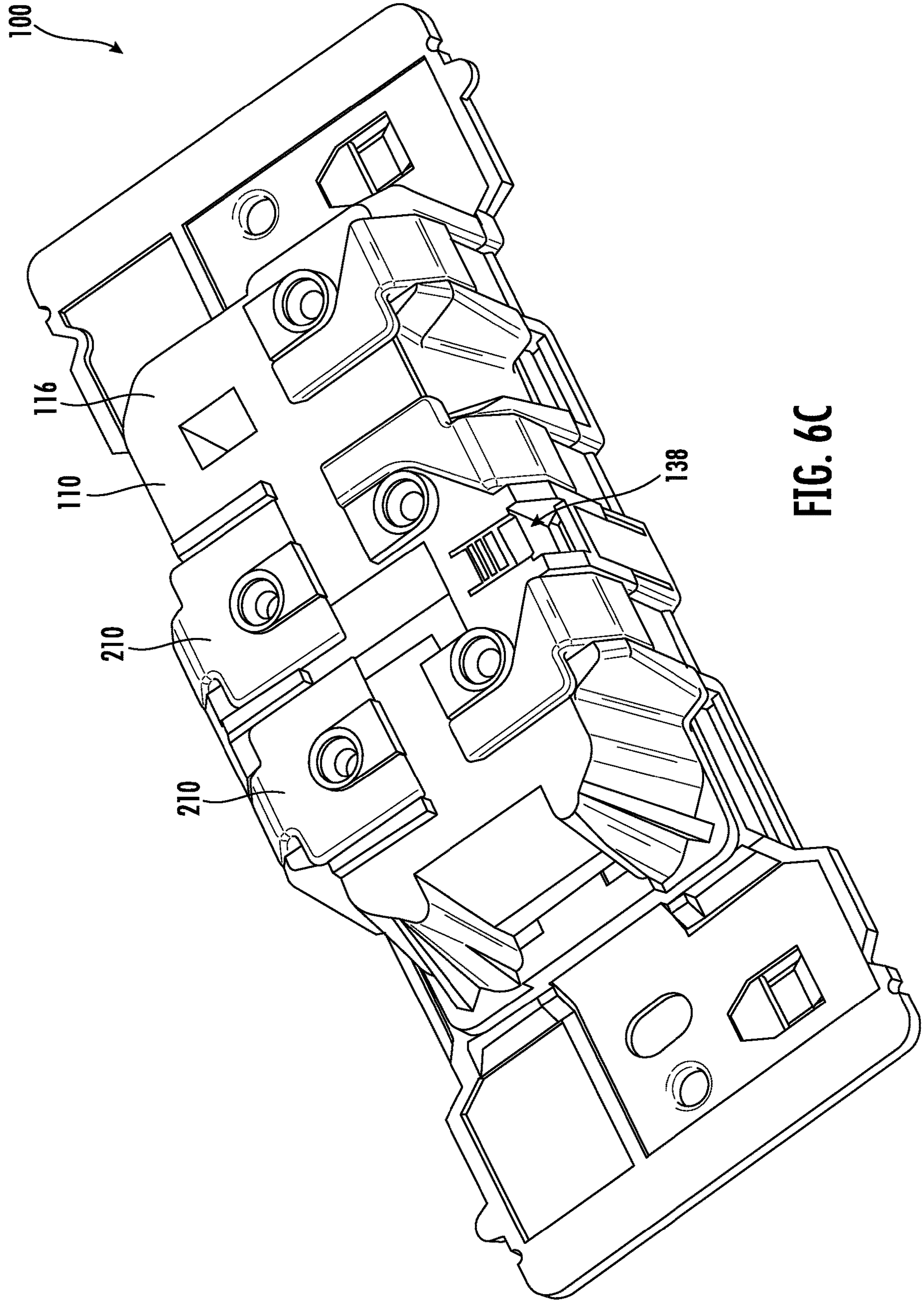
Figure 6D:
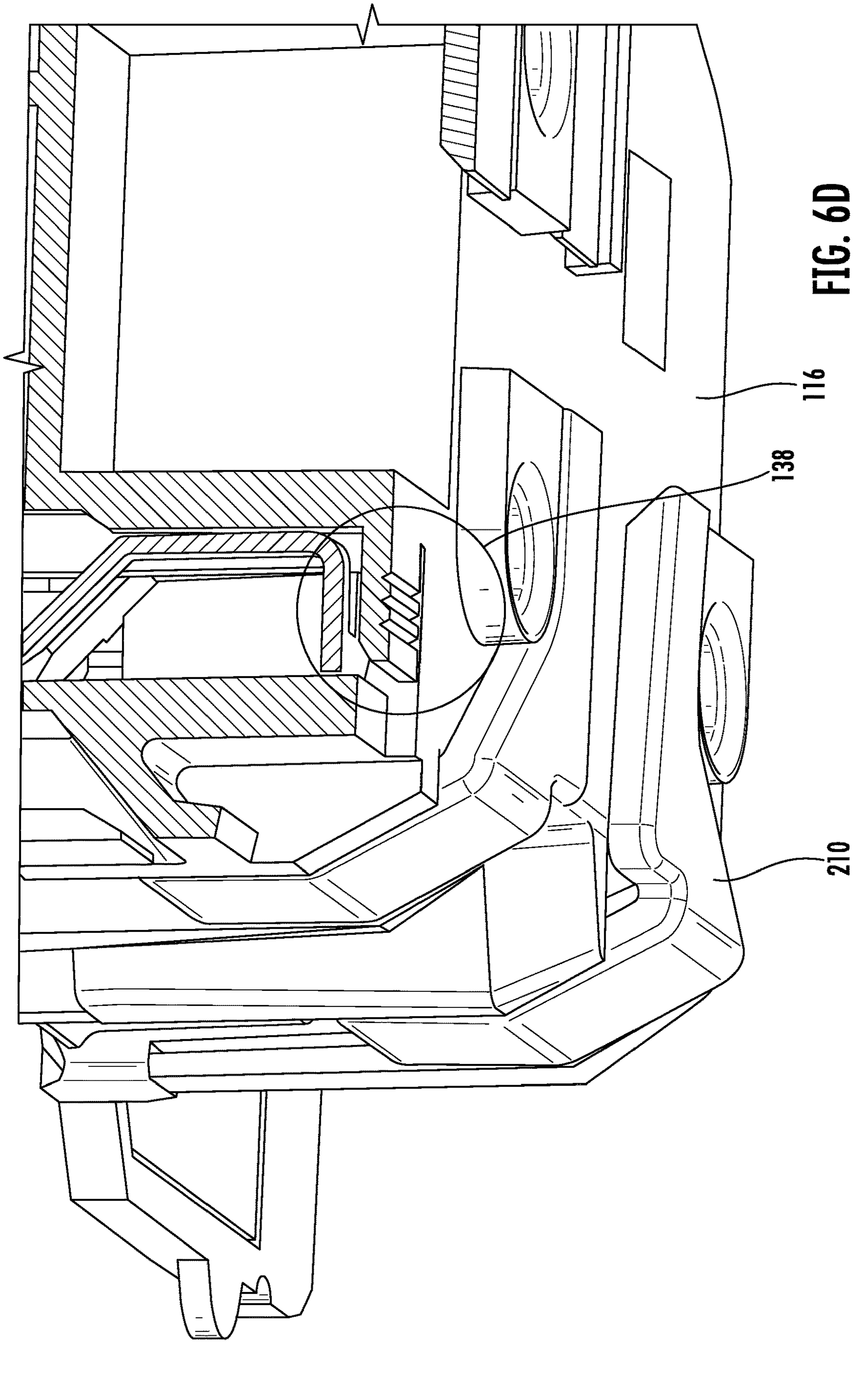
Figure 7A:
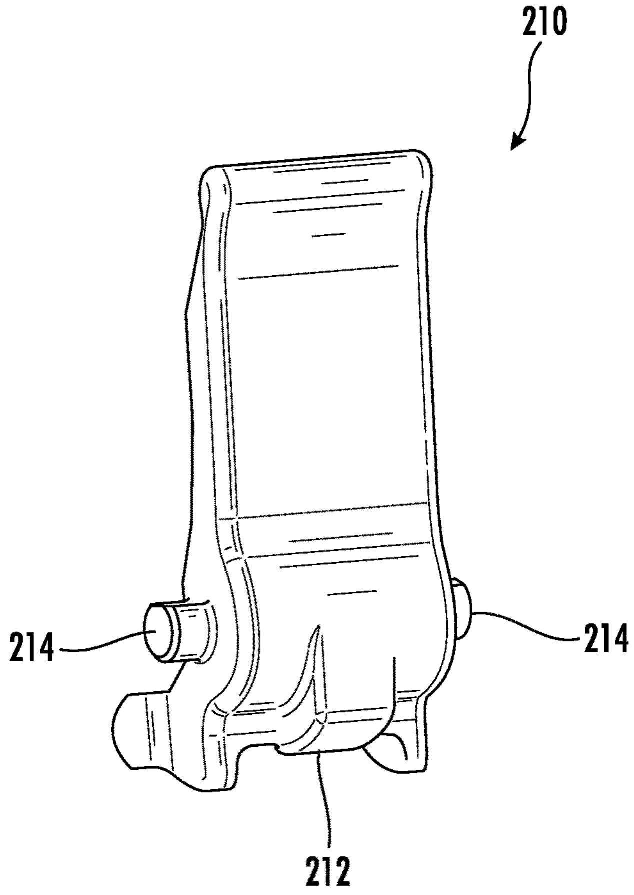
FIGS. 7A and 7B illustrate various views of an embodiment of a lever used in combination with the wire terminal shown in FIGS. 4 and 5.
Figure 7B:
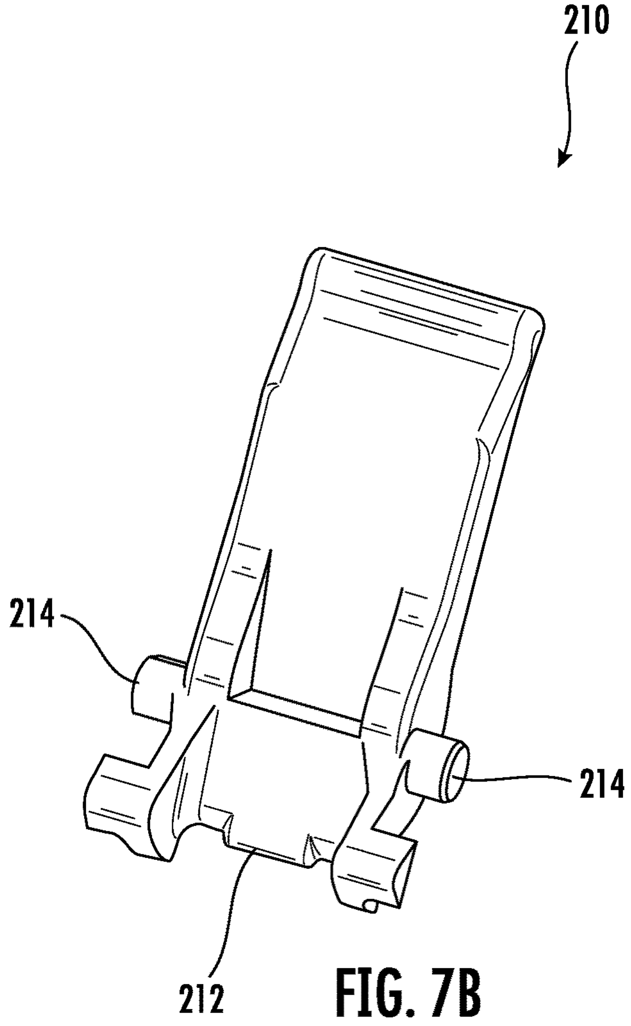

In addition, and/or alternatively, with reference to FIGS. 6A-6D, in accordance with one or more features of the present disclosure, the contact 130 may include a contact break off tab 134. As illustrated, in one embodiment, the contact 130 may include one or more score lines 136 to enable a user to breakoff and remove the contact break off tab 134. In use, the contact break off tab 134 enables a user the option to split the contact 130 in the wiring device 100, thereby creating two separately controllable circuits, for instance with a separate switching device. With reference to FIG. 6B, in one embodiment, the housing 110 may include a configurable portion 138. In one embodiment, the configurable portion 138 may be in the form of a living hinge that is movable between first and second positions to enable access to the contact break off tab 134. With reference to FIGS. 6C and 6D, with the levers 210 arranged and configured to rest on the rear surface 116 of the housing 110 in the first position, the configurable portion 138 may be positioned on the rear surface 116 of the housing where the levers 210 close on the against the housing 110. In use, the contact break off tab 134 is located under the configurable portion 138.

Figure 2A:
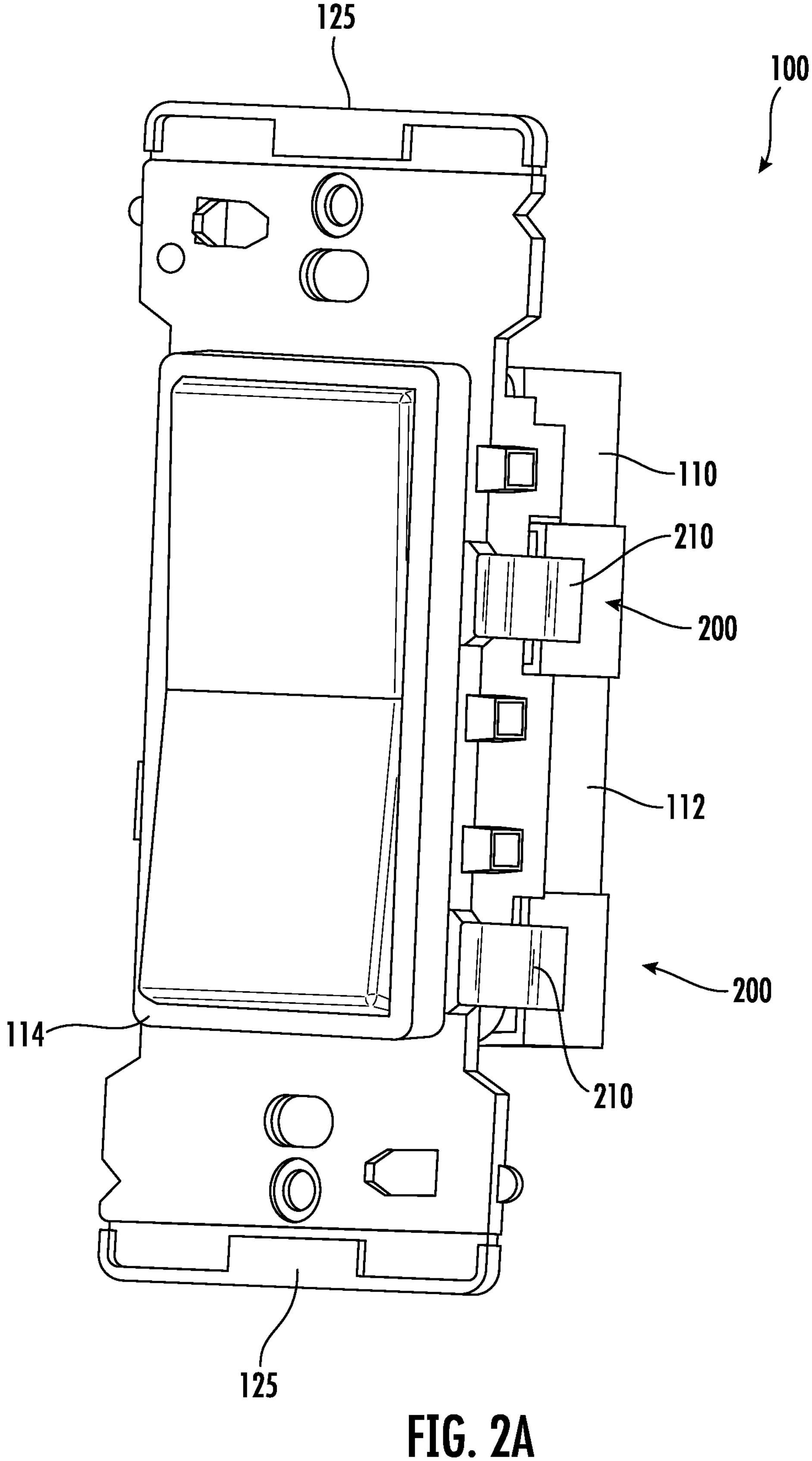
FIGS. 2A and 2B illustrate various views of an alternate embodiment of a wiring device in accordance with one or more features of the present disclosure.
Figure 2B:
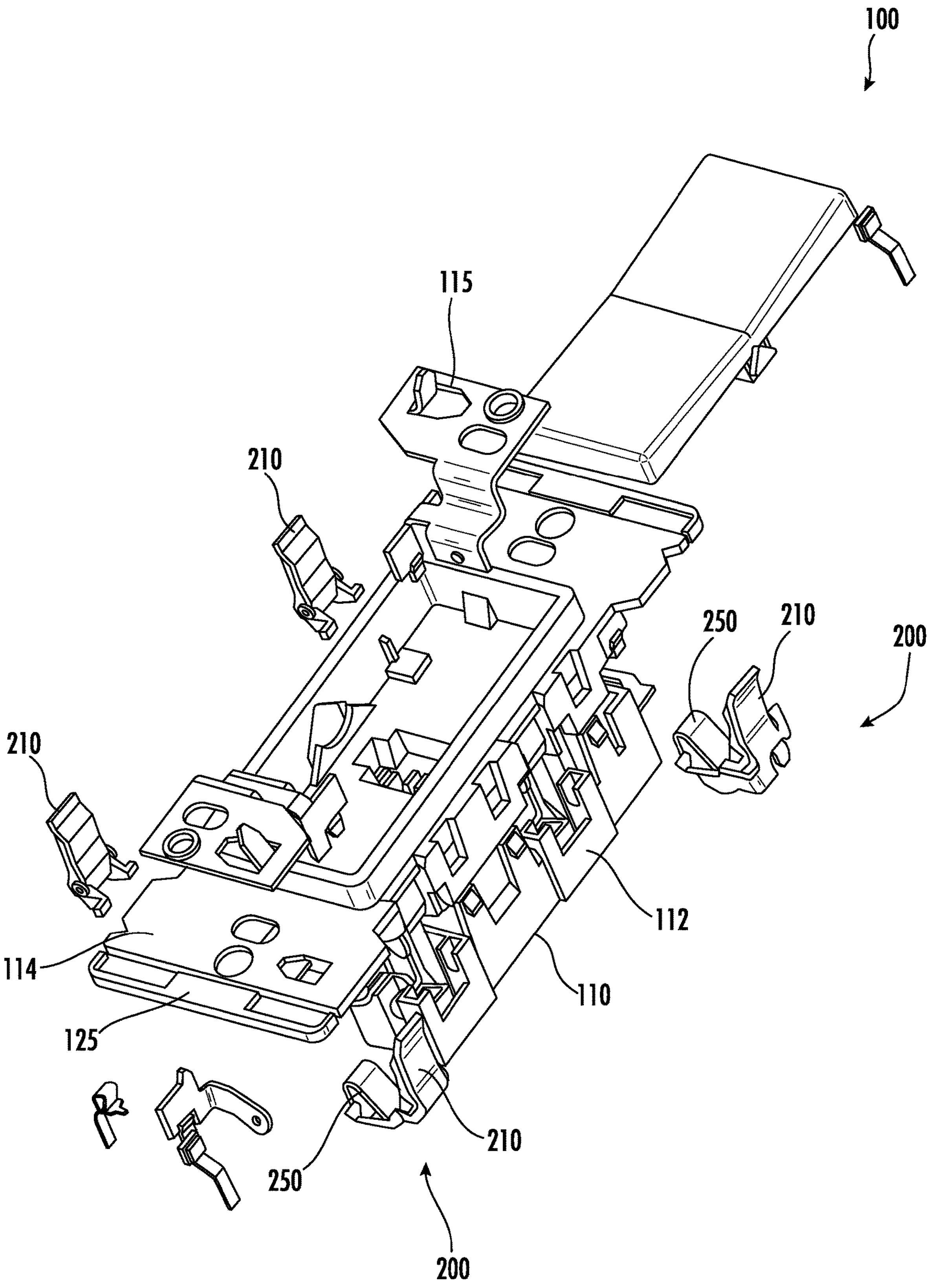

In addition, as illustrated in FIGS. 1A, 2A, and 2B, the front cover portion 114 of the wiring device 100 may include an extension break off tab 125 on each side of the wiring device 100. When installed in a wall box, the strap 115 and extension break off tabs 125 rest on the surface of the wall that surrounds the wall box. As such, when the extension break off tabs 125 remain in place, the wiring device can be at least partially supported by the surface of the wall even if there is a gap between the wall and the wall box. Alternatively, the extension break off tab 125 may be arranged and configured to be broken off to reduce the overall height of the front cover portion 114 if needed. For example, the extension break off tab can be removed to allow for a standard size wallplate (e.g., with dimensions of 2-¾"×4-½") to be installed on the wiring device 100. Otherwise, if the extension tabs 125 are left in place, a larger size wall plate (e.g., midsize with dimensions of 3-⅛"×4-⅞" or oversized with dimensions of 3-½"×5-¼") would need to be used to accommodate the larger overall height of the front cover portion 114.

Referring to FIGS. 4, 5, and 7A-8D, an example embodiment of a wire terminal 200 in accordance with one or more features of the present disclosure will be described. As will be appreciated by one of ordinary skill in the art, the wire terminal 200 may be incorporated into any wiring device such as, for example, wiring device 100.

As previously mentioned, and with additional reference to FIGS. 1A and 1B, the wiring device 100 includes a housing 110, one or more contacts 130 (FIGS. 4-6A), and a wire terminal 200. The wire terminal 200 includes a lever 210 and a spring element (e.g., a clamp spring) 250. In addition, in various embodiments and as will be described in greater detail below, the wire terminal 200 may include a secondary biasing element (e.g., a secondary basing spring) 270.

The contacts 130 may have any suitable configuration or form now known or hereafter developed suitable for transferring incoming line-voltage from the electrical wire to a load coupled to the wiring device 100. As such, the present disclosure should not be limited to any particular configuration or form of contact. As will be appreciated by one of ordinary skill in the art, the configuration or form of the contact may be dependent on the wiring device. For example, as illustrated in FIG. 6A, in one embodiment, when used in a duplex style receptacle, the contact 130 may include plug contact portions or receptacles 131 arranged and configured to engage a plug coupled thereto, or inserted into, the wiring device 100. Alternatively, when used in a switch, the contacts may include tabs arranged and configured to selectively provide power to the connected load depending on whether or not the switch is in the ON or OFF position. That is, as will be readily appreciated by one of ordinary skill in the art, the contact 130 is arranged and configured to accept plug blades in the case of the wiring device being a receptacle. In use, contact of the electrical wire with the contact facilitates load transfer from the electrical wire to the contact to the load coupled thereto.

With reference to FIGS. 4, 5, 7A, and 7B, and as previously mentioned, the wire terminal 200 includes a lever 210. In use, the lever 210 may have any suitable form. In use, the lever 210 is moveable between a first (e.g., closed) position (illustratively shown by the upper lever in FIGS. 4 and 5) and a second (e.g., opened) position (illustratively shown by the lower lever in FIGS. 4 and 5). In one embodiment, as illustrated, the lever 210 may be vertically pivotable (e.g., axis of the pivot may extend parallel to a longitudinal axis of the strap 115). That is, in one embodiment, the levers 210 may be positioned such that they extend from the side surfaces of the housing 110 of the wiring device 100. In one embodiment, the levers 210 may be pivotably coupled to the housing 110 via pivot pins 214, although this is but one configuration. In use, in one embodiment, in the first position, the levers 210 may be positioned adjacent to the side surfaces of the housing 110 of the wiring device 100. In the second position, the levers 210 may be pivoted by approximately 90-degrees so that the ends of the levers 210 extend away from the side surfaces of the housing 110. Thus arranged, the levers 210 are arranged and configured to sit below the face of the wiring device 100 such that the levers 210 are not visible once a wallplate is installed onto the wiring device 100. In addition, the levers 210 are preferably long enough to allow a user to open and close the lever 210 without the need for an excess amount of force and without the need for a tool such as a screwdriver allowing for tool-less wire termination.

In use, as will be appreciated by one of ordinary skill in the art, the lever 210 extends from the housing 110 of the wiring device 100 so that, during installation, a user may move the lever 210 from the first position to the second position to insert an electrical wire into the electrical wire receiving space S. Thereafter, once the electrical wire has been inserted, the user may move the lever 210 from the second position to the first position to retain the wire within the wire terminal 200 and abutting a face of the contact 130. As will be discussed in greater detail, moving the lever 210 from the first position to the second position biases (e.g., applies a force to) the clamp spring 250, which enlarges the electrical wire receiving space S to receive the electrical wire. Thereafter, once the electrical wire has been properly positioned within the electrical wire receiving space S, moving the lever 210 from the second position to the first position enables the clamp spring 250 to return to its natural, at rest position, which applies a clamping force to the electrical wire positioned within the electrical wire receiving space S, thereby securing or coupling the electrical wire to the contact 130.

That is, once the electrical wire is installed into the electrical wire receiving space S, the lever 210 may be pivoted to the first position. In the first position, the lever 210 and/or the clamp spring 250 may be arranged and configured to apply a force to retain the electrical wire within the electrical wire receiving space S and to ensure that the electrical wire remains in operative contact with the contact 130 of the wiring device 100. That is, in the first position, the clamp spring 250 and/or the lever 210 are arranged and configured to provide a desired retention force to maintain the electrical wire within the electrical wire receiving space S (e.g., the clamp spring 250 is arranged and configured to press against the installed electrical wire and to press or bias the electrical wire against the contact 130). In addition, in one embodiment, the clamp spring 250 may also be arranged and configured to “cut” into the electrical wire to ensure contact is maintained as will be described in greater detail below.

Referring to FIG. 1C, in accordance with one or more features of the present disclosure, the wiring device 100 may include a housing 110 having an aperture 118 formed in a rear surface 116 thereof. In use, the aperture 118 is arranged and configured to receive the electrical wire therein. In addition, the aperture 118 is aligned with the electrical wire receiving space S defined by the clamp spring 250 (as will be described in greater detail below) so that when the electrical wire is inserted through the aperture 118, the electrical wire can be received within the electrical wire receiving space S when the lever 210 is in the second position.

Figure 1D:
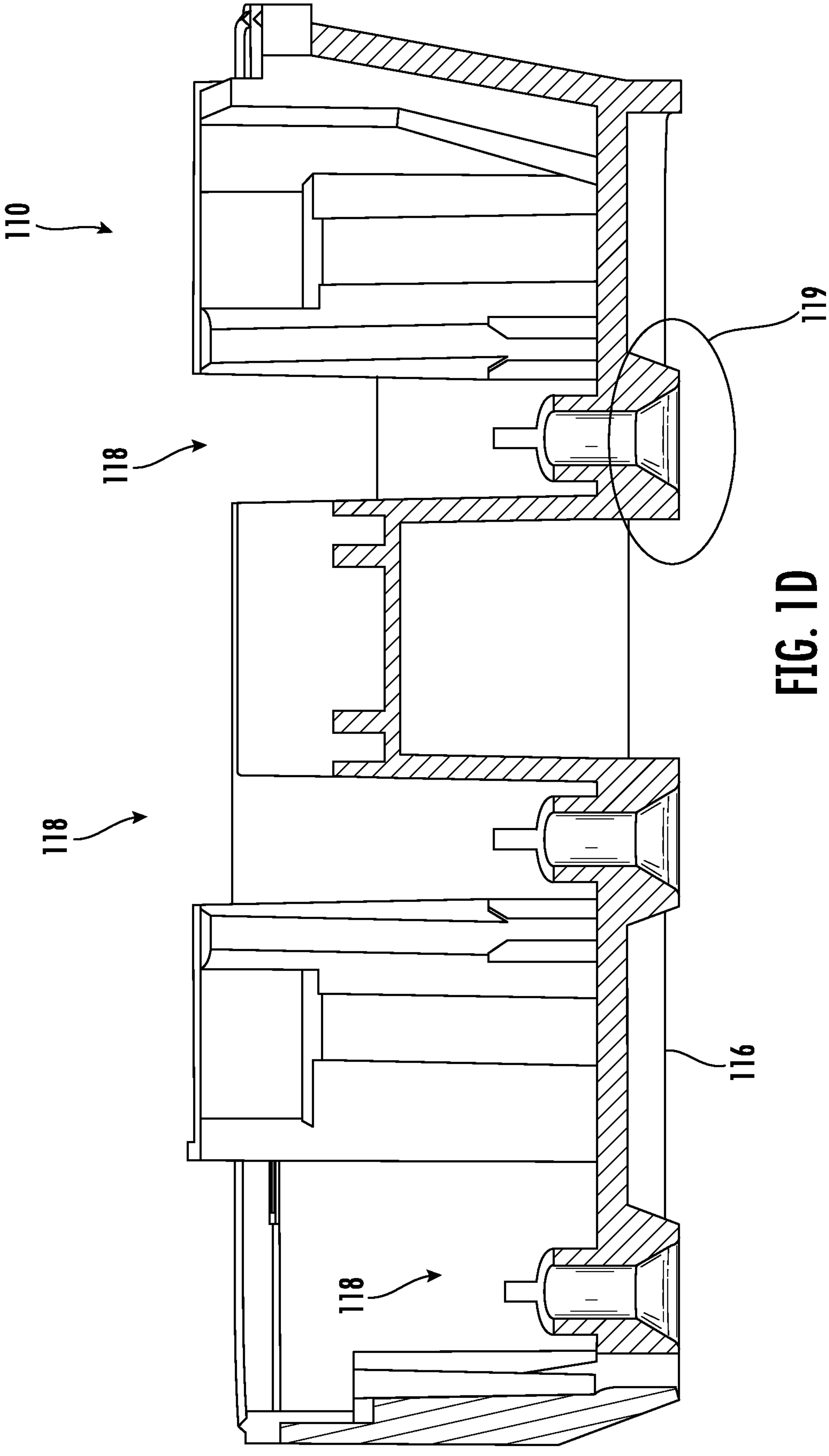
FIG. 1D illustrates a longitudinal cross-sectional view of the housing of the wiring device shown in FIGS. 1A-1C, the housing incorporating guided regions or surfaces.

In one embodiment, as best illustrated in FIG. 1D, the housing 110 may include guided regions or surfaces 119 around the aperture 118 formed in the rear surface 116 of the housing 110. In use, the guided regions or surfaces 119 may be arranged and configured to guide or direct the electrical wire as it is inserted into the aperture 118 formed in the rear surface 116 of the housing 110. In one embodiment, as illustrated, the guided regions or surfaces 119 may have a conical or funnel shape for guiding or directing the electrical wire as it is inserted into the aperture 118 formed in the rear surface 116 of the housing 110 (e.g., the guided regions or surfaces 119 are arranged and configured to funnel the electrical wires). In one embodiment, the guided regions or surface 119 may be formed using the materials (e.g., plastic material) used to manufacture the housing 110, although other configurations are envisioned. Thus arranged, the guided regions or surfaces 119 facilitate easier insertion of, for example, stranded electrical wire. In addition, the guided regions or surfaces 119 prevent the exposure of bare copper if the extra insulation of the electrical wires is removed during installation or if the electrical wires are bent when the wiring device 100 is being installed into a wall box.

Figure 1E:
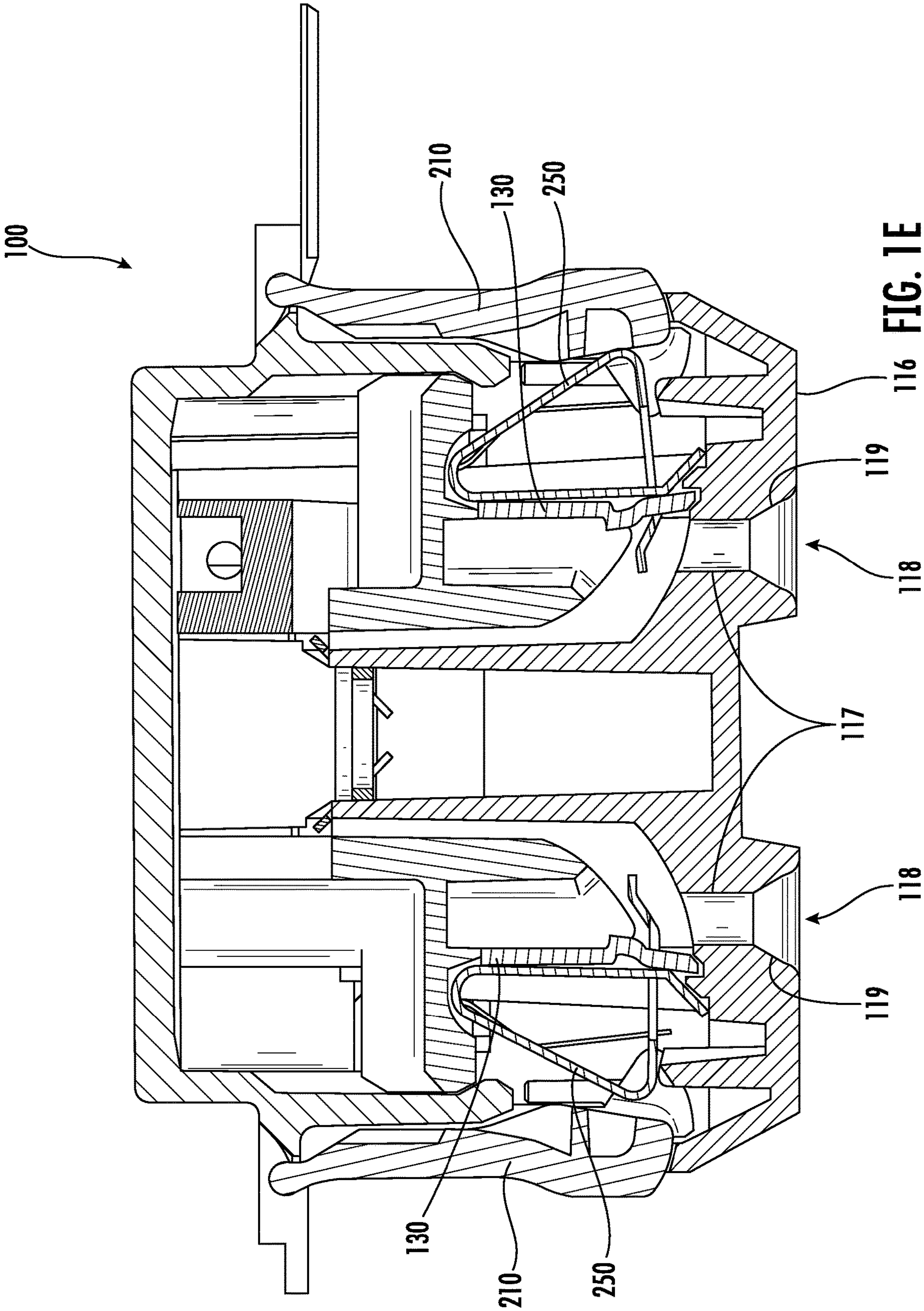
FIG. 1E illustrates a lateral cross-sectional view of the housing of the wiring device shown in FIGS. 1A-1C, the housing incorporating internal geometry configured to prevent insertion of damaged or excessively twisted electrical wire.

In addition, and/or alternatively, as best illustrated in FIG. 1E, the housing 110 may include additional internal geometry 117 adjacent to the aperture 118 formed in the rear surface 116 of the housing 110, the geometry 117 being arranged and configured to prevent insertion of damaged or excessively twisted electrical wire. The internal geometry 117 being arranged and configured to prevent insertion of the electrical wire (e.g., reject the insertion of damaged electrical wire). As illustrated, in one embodiment, the internal geometry 117 may have a circular shape with a smaller diameter than the aperture 118 formed in the rear surface 116 of the housing 110. In use, the circular section is arranged and configured to reject damaged or excessively twisted wire.

Figure 1F:
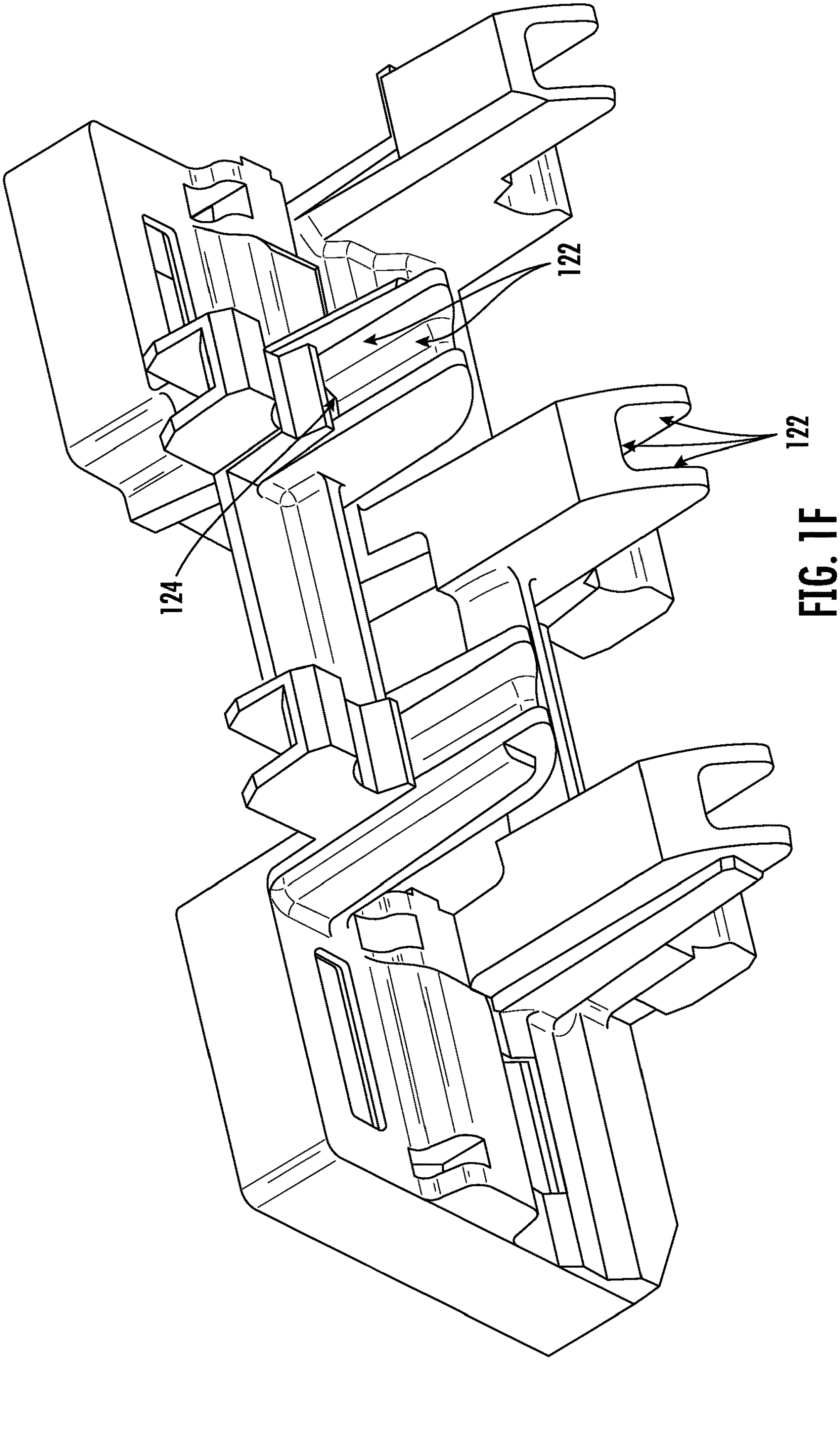
FIG. 1F illustrates a partial view of the housing of the wiring device shown in FIGS. 1A-1C, the housing incorporating wire guides and stops configured to guide insertion of an electrical wire.

In addition, and/or alternatively, with reference to FIG. 1F, the housing 110 may include geometry such as, for example, internal walls arranged and configured to act as wire guides 122 to prevent the electrical wire from moving laterally with respect to its axis (e.g., in the plane parallel to the front face of wiring device 100) direction to improve the security of the electrical wire in the wiring device 100. That is, in one embodiment, each aperture 118 formed in the rear surface 116 of the housing 110 for receiving an electrical wire may have a dedicated area or cavity where the electrical wire is received. The geometry or cavity blocking or limiting motion of the electrical wire. Thus, the wire guides 122 define a cavity arranged and configured to enable the electrical wire to enter through the aperture 118 formed in the rear surface 116 of the housing 110 and through the aperture 258 formed in the first leg, arm, segment, etc. 252 of the clamp spring 250 (terms leg, arm, segment used interchangeably herein without the intent to limit or distinguish) while preventing, or at least inhibiting, excessive motion in the lateral directions. Moreover, the housing 110 may include a wall that acts as a "stop" 124 to prevent over-insertion of the wire (e.g., prevent the wire from traveling too far in the direction towards the front face of the wiring device 100), which helps to isolate the electrical wire and prevent it from contacting other areas of the device internally. For example, in one embodiment, a stop 124 may be provided at the end of a channel. The wall or stop 124 prevents the wire from being inserted too far into the wiring device and contacting other internal components.

In use, the geometries, guides, stops, etc. can be integrally formed with the housing of the wiring device, or may be separated formed.

Figure 8A:
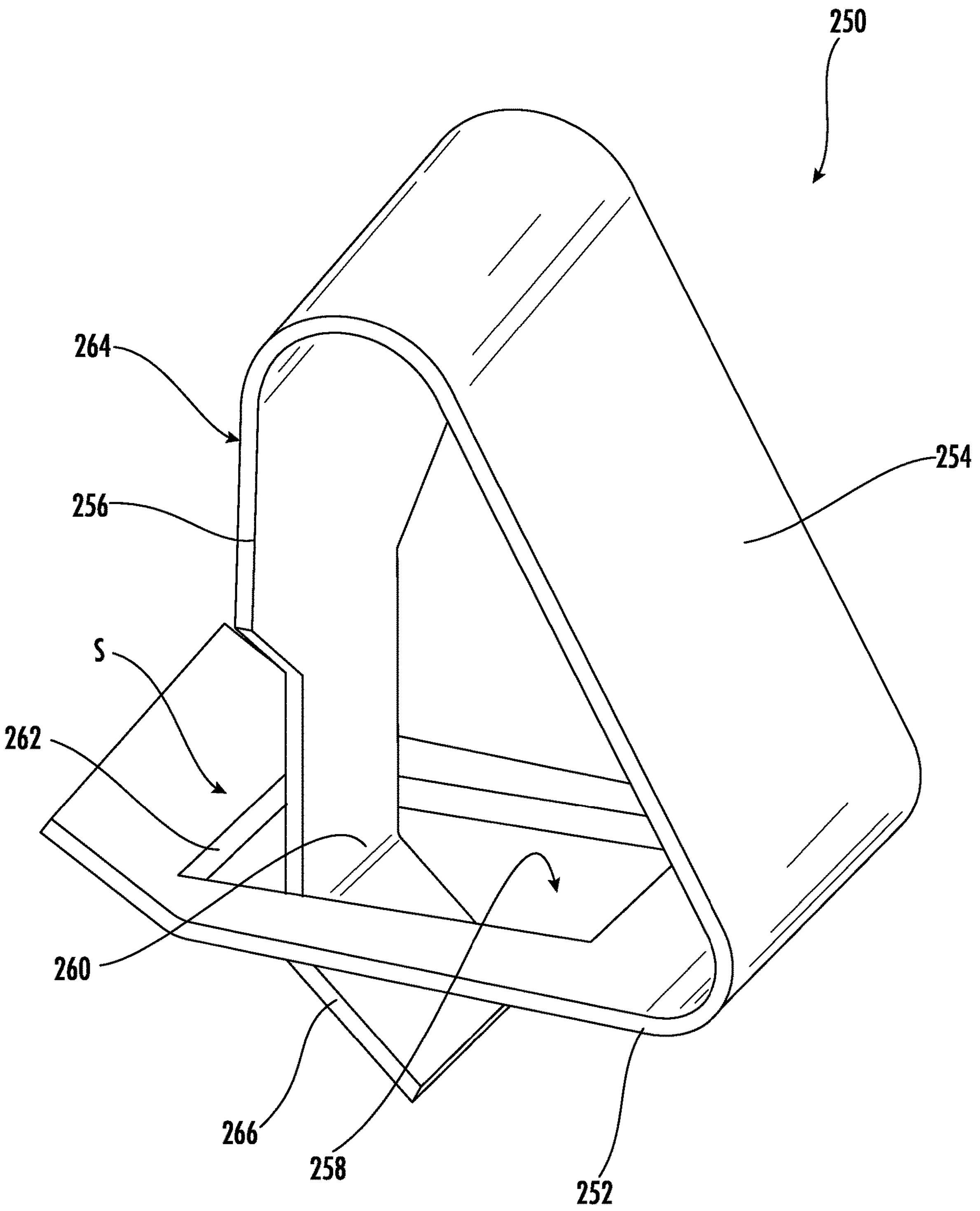
FIG. 8A illustrates a perspective view of an embodiment of a clamp spring used in combination with the wire terminal shown in FIGS. 4 and 5.
Figure 8B:
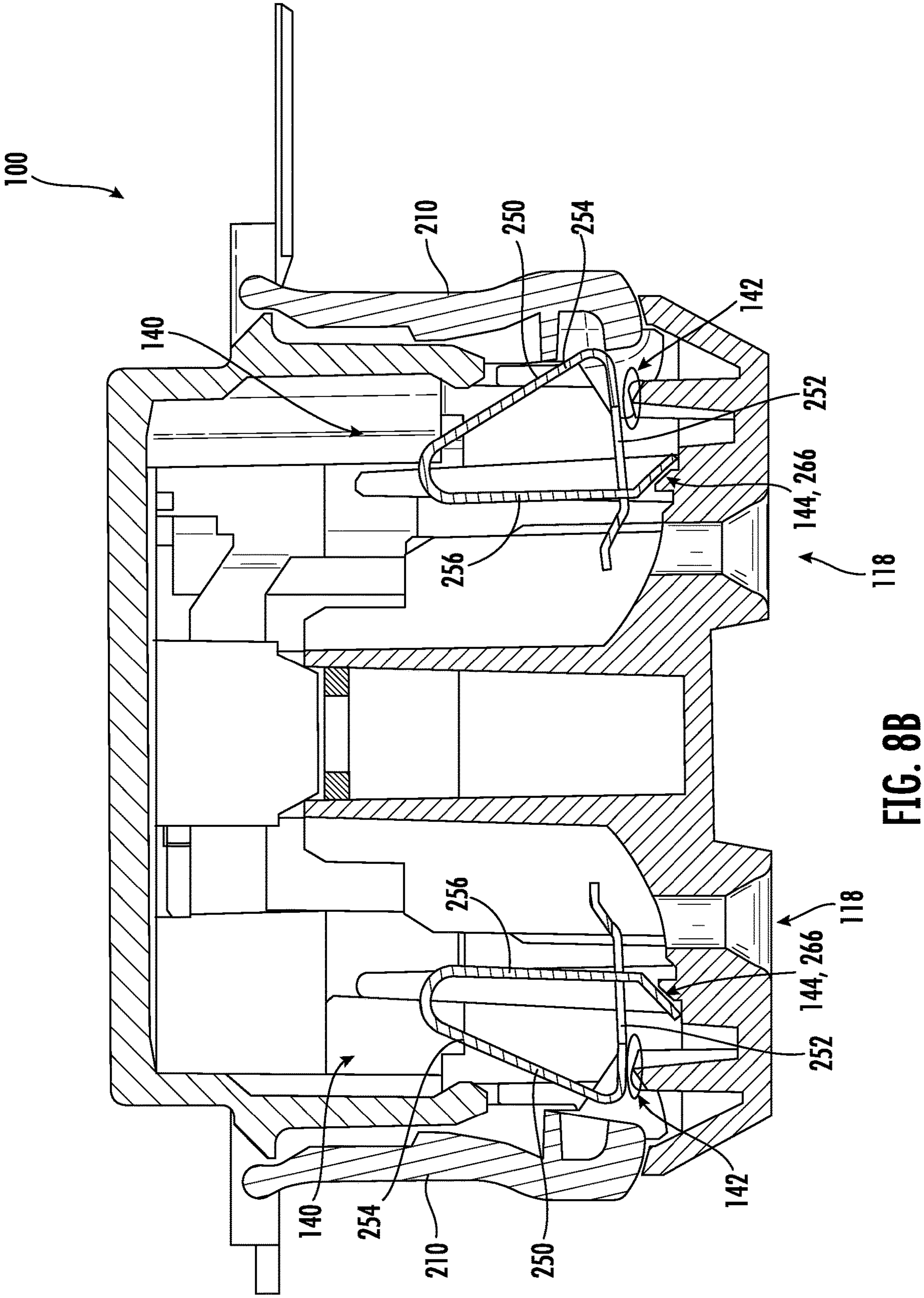
FIGS. 8B, 8C, and 8D illustrate various cross-sectional views of the clamp spring shown in FIG. 8A positioned within a housing of the wiring device in accordance with one or more features of the present disclosure.
Figure 8C:
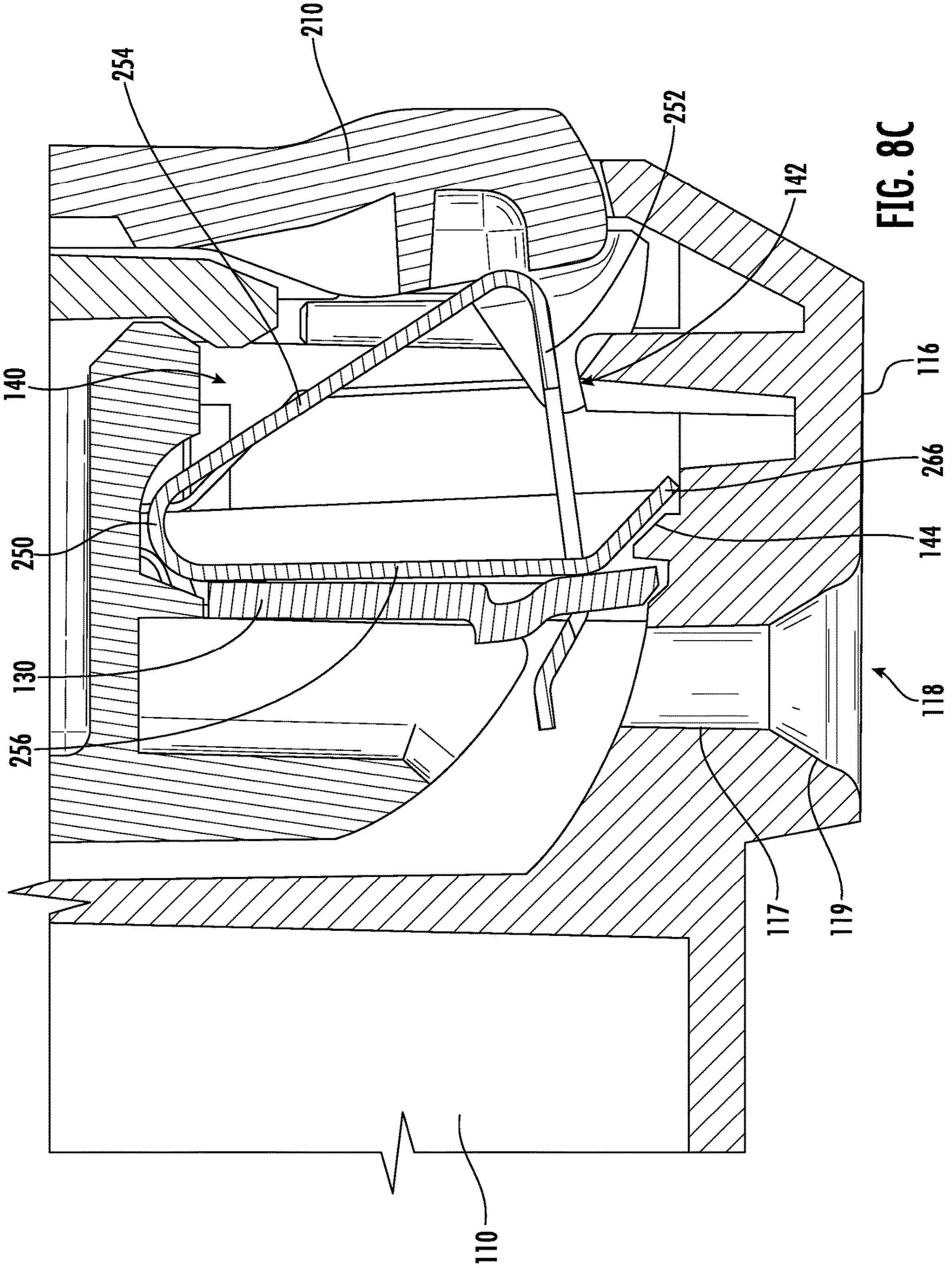

With reference to FIGS. 4, 5, and 8A-8C, the clamp spring 250 may be coupled, or be in direct contact, with the contact 130. In one embodiment, as illustrated in FIGS. 8A-8C (e.g., the first or closed position), the clamp spring 250 includes a first leg 252, a second leg 254, and a third leg 256. The first leg 252 including an aperture 258 formed therein. In one embodiment, the first leg 252 may extend substantially horizontally (e.g., substantially perpendicular to a longitudinal central axis of the contact 130 and/or strap 115). The third leg 256 includes a stem or portion 260 that projects through the aperture 258 of the first leg 252. As will be described in greater detail below, a portion 266 such as, for example, a bent end portion of the third leg 256 may protrude through the aperture 258 formed in the first leg 252. The second leg 254 couples to both an end of the first leg 252 and an end of the third leg 256. In use, movement of the lever 210 from the first position to the second position, applies a compression force onto the clamp spring 250. In one embodiment, this compression force may cause the first and second legs 252, 254 of the clamp spring 250 to move. In one embodiment, the first and second legs 252, 254 may move closer to the contact 130. Thus arranged, the third leg 256 of the clamp spring 250, and more specifically, the stem 260 moves relative to the first leg 252 within the aperture 258. As a result, the electrical wire receiving space S, which is defined by the wire contacting surface 262 formed along the aperture 258 of the first leg 252 and the wire facing surface 264 of the third leg 256 is enlarged. That is, the electrical wire receiving space S defined by a contact facing side of the third leg 256 and the wire contacting surface 262 formed along the aperture 258 formed in the first leg 252 is enlarged to facilitate insertion of the electrical wire into the electrical wire receiving space S. For example, in one embodiment, moving the lever 210 from the first position to the second position, causes a bearing surface 212 (FIG. 7B) formed on the lever 210 to contact the clamp spring 250, which moves the first leg 252 relative to the third leg 256 thereby enlarging the electrical wire receiving space S. Thereafter, once the electrical wire has been properly inserted into the electrical wire receiving space S, moving the lever 210 from the second position to the first position (e.g., user pivots the lever 210 from the second position to the first position), causes the clamp spring (e.g., the third leg 256) to bias the inserted electrical wire against the wire facing surface 264 of the third leg 256 and/or against the face of the contact 130. In one embodiment, the clamp spring 250 is arranged and configured to apply a force onto the lever 210 to maintain the lever 210 in the first position once the lever 210 has moved a certain amount or percentage from the second position.

In one embodiment, as illustrated, the wire contacting surface 262 formed along the aperture 258 of the first leg 252 includes a projection or sharpened stab (terms used interchangeably herein without the intent to limit or distinguish) arranged and configured to engage or bite into the electrical wire to provide additional retention force in maintaining the electrical wire in the electrical wire receiving space S in the first position. Incorporation of the stab creates a sharp edge to provide increased pressure to provide improved securement of the electrical wire (e.g., the clamp spring 250 incorporates a sharp edge along the wire contacting surface 262 formed along the aperture 258 of the first leg 252 to provide increase pressure, and hence improved retention, to securely engage the electrical wire to the contact when the wire is installed into the device, the sharp edge allows the clamp spring to "cut" into the wire to aid in wire retention).

Movement of the levers 210 from the first position to the second position, causes the electrical wire receiving space S defined by the aperture 258 in the clamp spring 250 and the third leg 256 of the clamp spring 250 to enlarge so that an electrical wire can be inserted into the housing 110 through the aperture 118 formed in the rear surface 116 of the housing 110 and into the electrical wire receiving space S. Thereafter, once properly position, the levers 210 can be moved from the second position to the first position such that the lever 210 and the clamp spring 250 securely engage the electrical wire within the electrical wire receiving space S and/or against the face of the contact 130. In use, the bearing surface 212 may be provided on an inner surface of the lever 210. Movement of the lever 210 from the first position to the second position causes the bearing surface 212 to contact the clamp spring 250 thereby moving the first and third legs 252, 256 relative to each other thereby enlarging the electrical wire receiving space S formed in the wire terminal 200.

Figure 9A:
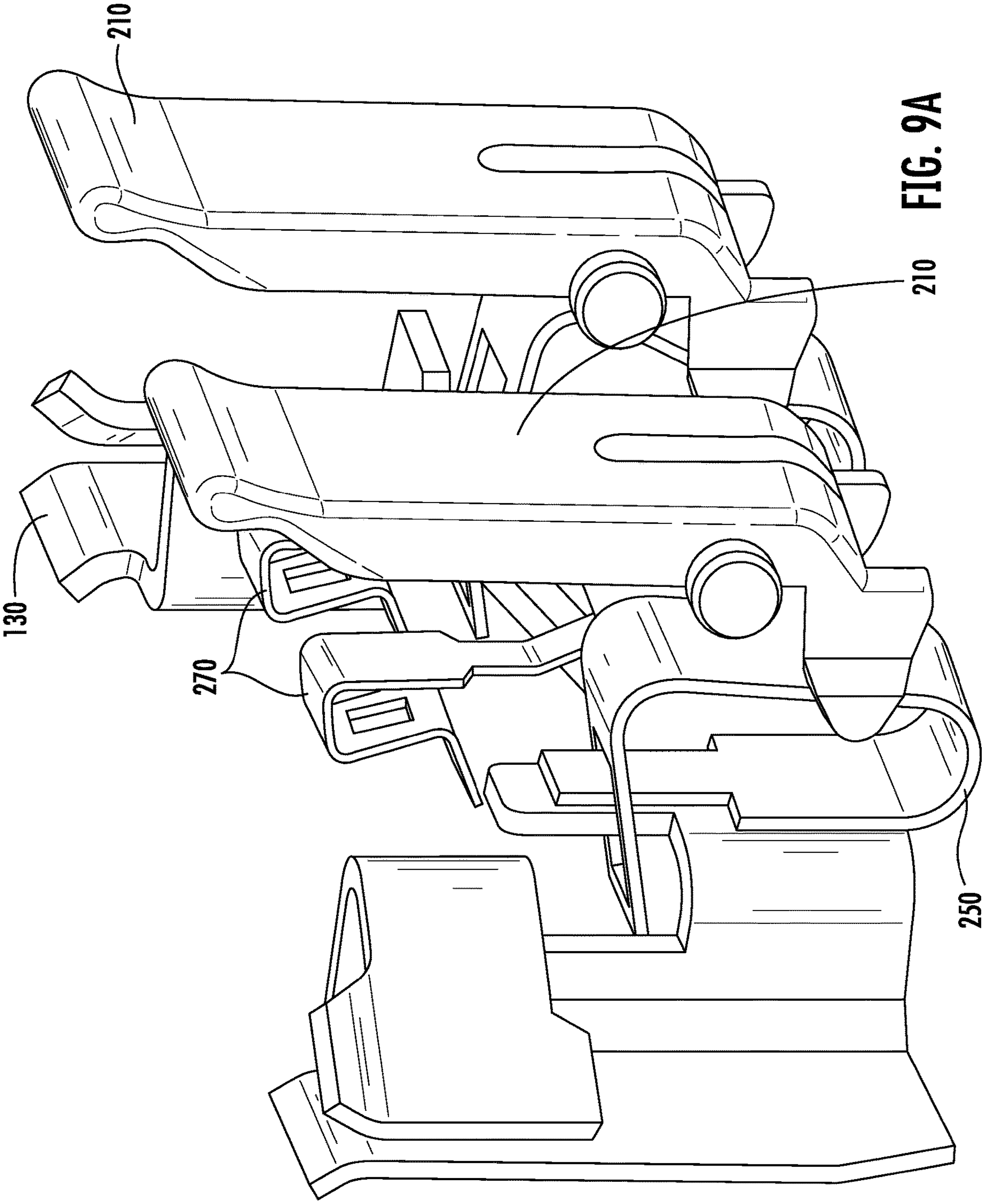
FIGS. 9A and 9B illustrate various views of an alternate embodiment of a clamp spring in accordance with one or more features of the present disclosure.
Figure 9B:
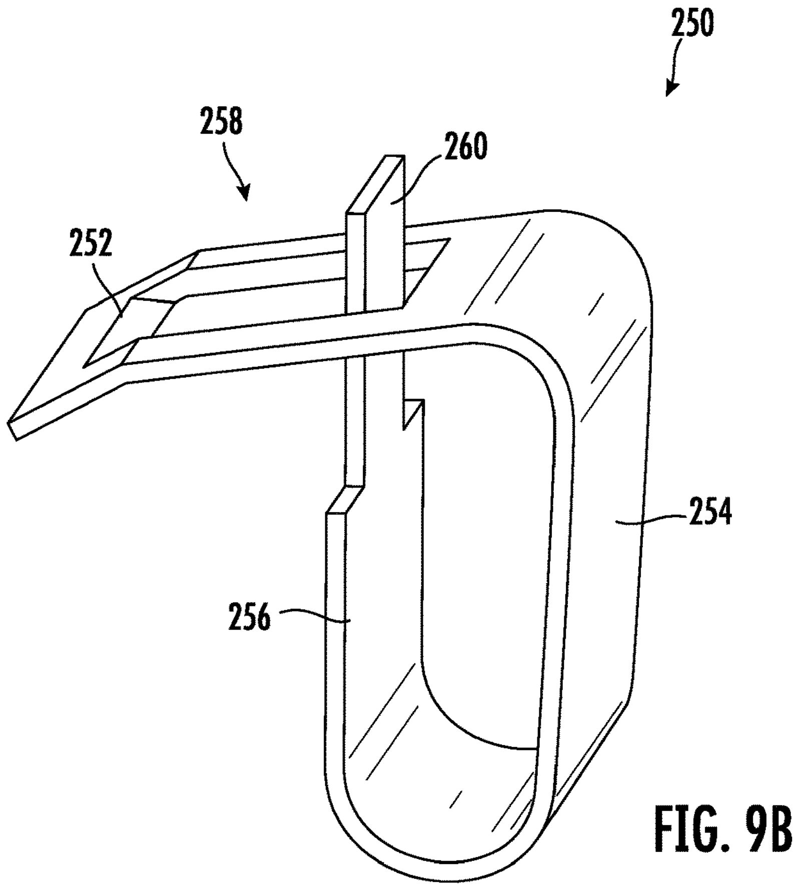

While a particular embodiment, configuration, or orientation of the clamp spring 250 has been shown and described, alternate embodiments, configurations, and/or orientations are envisioned. For example, with reference to FIGS. 9A and 9B, the clamp spring 250 may be reverse or oriented such that the first leg 252, and hence the aperture 258 formed in the clamp spring 250, is positioned along the top or away from the aperture 118 formed in the rear surface 116 of the housing 110 for receiving the electrical wire (e.g., closer to the front surface or cover of the housing 110). However, it has been found that by orientating the first leg 252, and hence the aperture 258 in the clamp spring 250, closer to the aperture 118 formed in the rear surface 116 of the housing 110 for receiving the electrical wire, better wire retention is obtained. Specifically, while both embodiments, create a counter-clockwise moment as illustrated in the FIGS., by positioning the aperture 258 in the clamp spring 250 closer to the contact 130 and in the lower left quadrant, movement of the lever 210 from the second position to the first position tends to move the aperture 258 in the clamp spring 250, and hence the electrical wire, closer to the contact 130 thereby improving wire retention. This has been found to be particularly useful when the electrical wire is in the form of a stranded wire.

With reference to FIGS. 8B and 8C, in one embodiment, the clamp spring 250 may be positioned within a pocket 140 formed in the housing 110 of the wiring device 100. In one embodiment, the pocket 140 may include angled walls or supporting surfaces 142, 144 that are angled to constrain the clamp spring 250 while allowing the clamp spring 250 to rotate, thus maximizing clamping force when the lever 210 is in the first position. In use, after the electrical wire has been clamped against the contact 130 by the clamp spring 250, a force is applied such that if a user attempts to remove the electrical wire from the wiring device 100 by pulling on the wire, a portion of the clamp spring 250 (e.g., a bent end portion 266 of the third leg 256 of the clamp spring 250) along with the surfaces 142, 144 of the pocket 140 formed in the housing 110 act to increase the retention force (or bite) of the clamp spring 250 against the wire. The force imparted by the pull of the wire creates a moment on the clamp spring 250 that acts to increase the retention force of the clamp spring 250. In one embodiment, the clamp spring 250 may undergo three stress states. With the lever 210 in the first position, the clamp spring 250 may undergo the maximum stress. With the lever 210 in the second position, the clamp spring 250 may undergo the least stress. The clamp spring 250 may undergo a level of intermediate stress while the clamp spring 250 is moved to a position just before the second position (e.g., least stress state) with the clamp spring 250 biting on the electrical wire. During the intermediate stress state, the angled surfaces 142, 144 act to constrain the clamp spring 250. Thus arranged, the clamp spring 250 contacts and/or interacts with the angled surfaces 142, 144 formed in the housing 110 when an inserted wire is pulled, which causing the clamp spring 250 to rotate counterclockwise as viewed in FIGS. 8B and 8C, which drives the wire and the clamp spring 250 further into the contact 130 thereby increasing the clamping force. That is, when the electrical wire is being pulled out of the wiring device 100 with the lever 210 in the first position, the interaction between clamp spring 250 (e.g., the bent end portion 266 of the third leg 256 of the clamp spring 250) and its interaction point with the housing 110 create a moment and increase retention force.

Figure 8D:
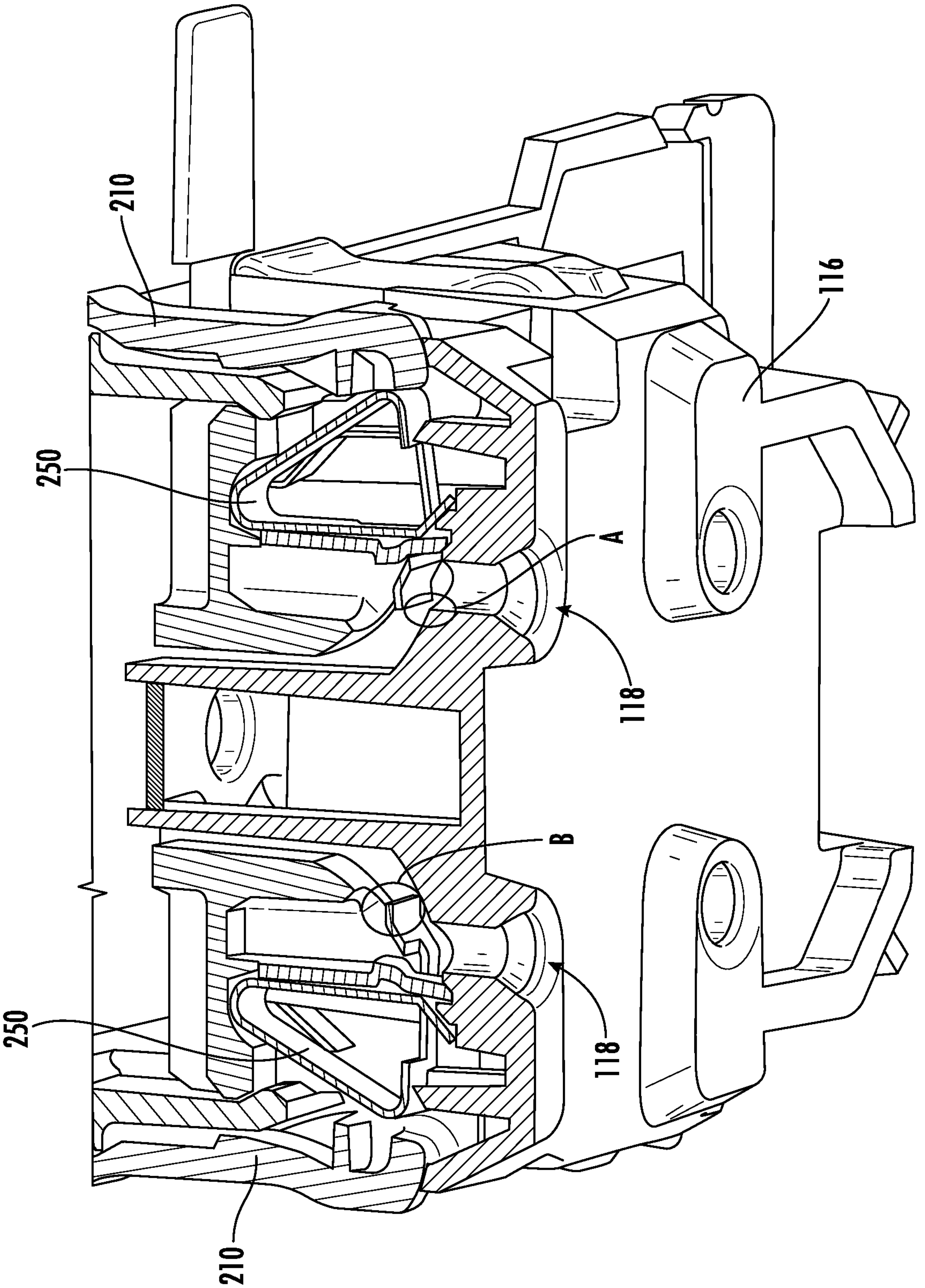

With additional reference to FIG. 8D, in one embodiment, in order to prevent a user from improperly inserting the electrical wire into a space A created between the aperture 118 formed in the rear surface 116 of the housing 110 and the outside most distal edge of the clamp spring 250, the most distal edge of the clamp spring 250 may be extended toward the longitudinal centerline of the wiring device. In addition, a bend B may be provided to catch the wire and prevent it from entering the space A.

Figure 4:
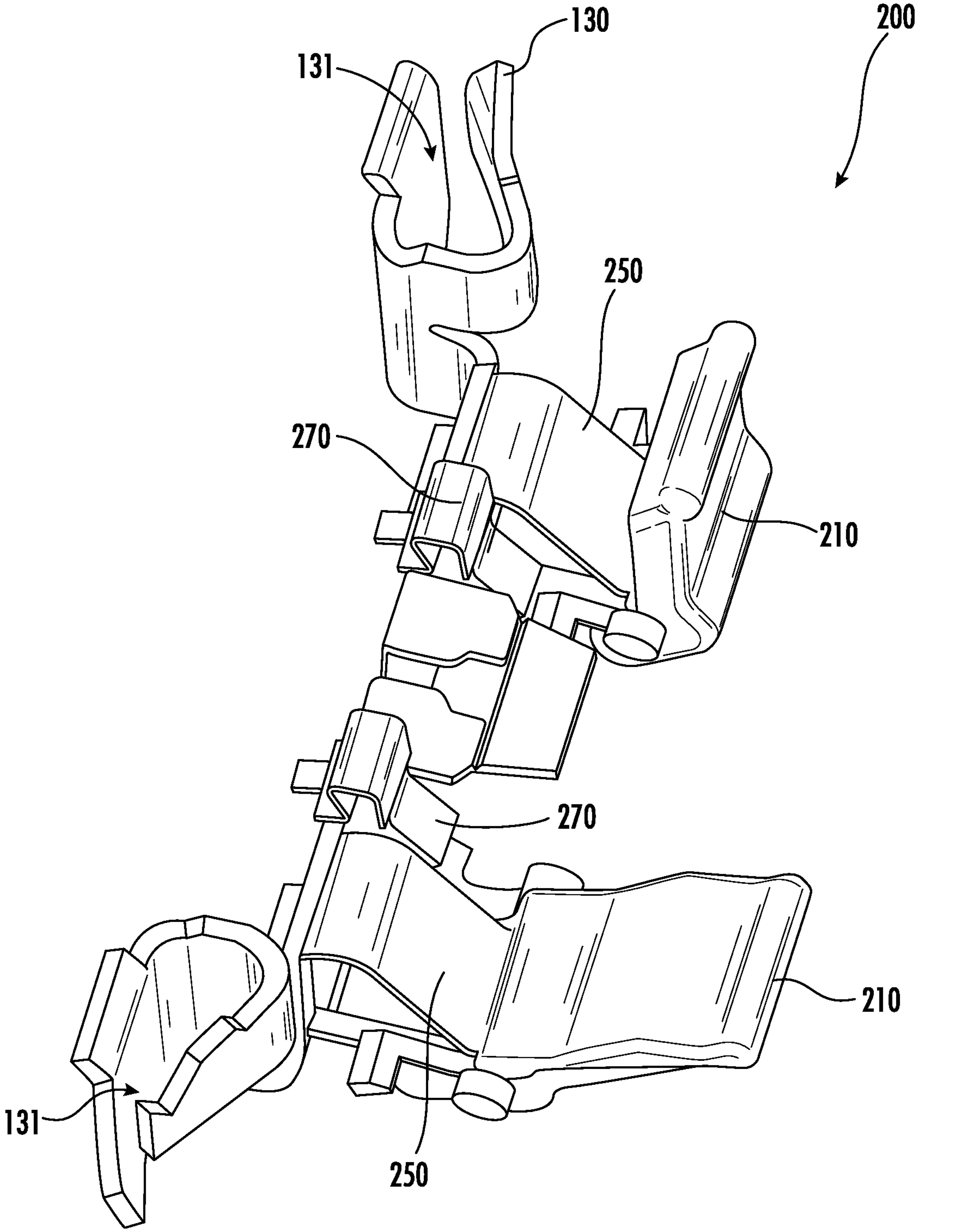
FIG. 4 illustrates a perspective view of an embodiment of a wire terminal in accordance with one or more features of the present disclosure, the wire terminal shown coupled to a contact of a wiring device.
Figure 5:
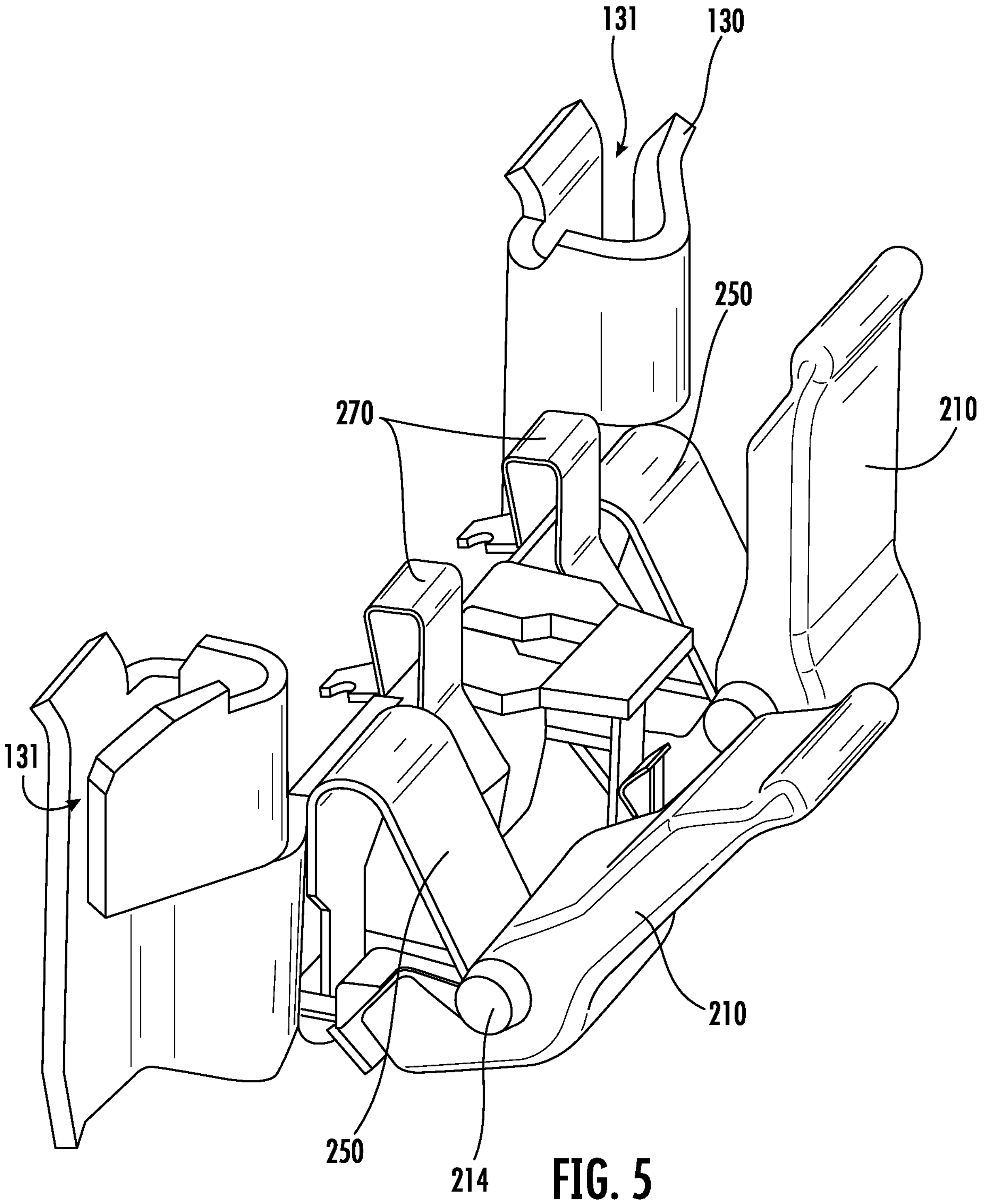
FIG. 5 illustrates an alternate perspective view of the wire terminal shown in FIG. 4.
Figure 10:
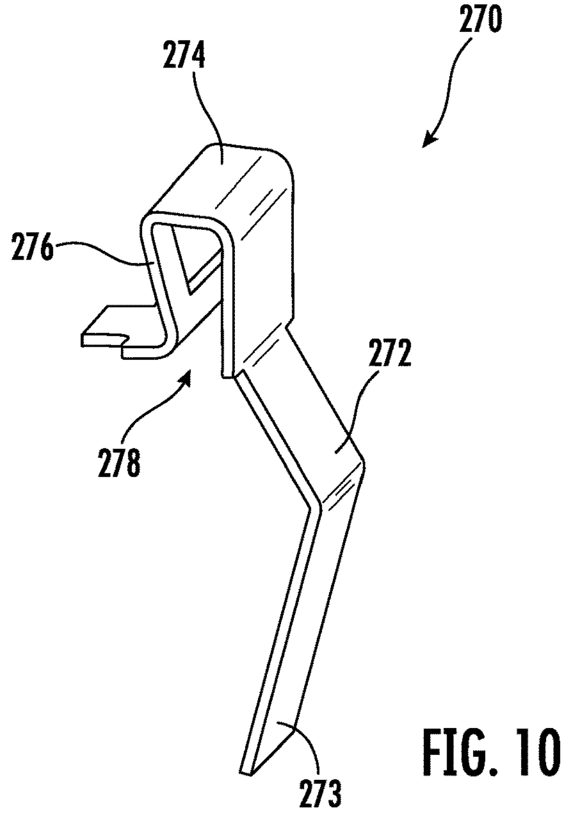
FIG. 10 illustrates a perspective view of an embodiment of a biasing spring used in combination with the wire terminal shown in FIGS. 4 and 5.

Referring to FIGS. 4, 5, and 10, in accordance with one or more features of the present disclosure, the wire terminal 200 may also include a secondary biasing element (e.g., a secondary basing spring) 270 arranged and configured to bias the lever 210 to the first position. Thus arranged, the biasing spring 270 is arranged and configured to assist with maintaining the lever 210 in the first position, and thus prevent, or at least inhibit, inadvertent actuation or movement of the lever 210 to the second position during, for example, installation of the wiring device 100 into the wall box. That is, in use, the biasing spring 270 is arranged and configured to act on the lever 210 (e.g., to apply a biasing force onto the lever 210) to ensure that when the lever 210 has traveled fully through its range of motion, there are no "dead zones" where the lever 210 is loose or likely to fall into the second position (e.g., the biasing spring 270 ensures that when a user closes the lever 210, the lever 210 remains in the first position such that the lever 210 is flush against the side of the housing 110). In other words, the lever 210 and the biasing spring 270, together act similar to an over-center mechanism where the first and second positions are stable positions. When the lever 210 is at any point in its range of motion between the first and second positions, the lever 210 is biased to "snap" to either the first or second positions.

In addition, in use, the biasing spring 270 is arranged and configured to take up any slack caused by insertion of the electrical wire into the electrical wire receiving space S defined by the clamp spring 250. The biasing spring 270 acts to bias the lever 210 to the first position when a wire is inserted into the electrical wire receiving space S thereby assisting with removing any slack in the lever occurring due to repositioning or reorientation of the clamp spring 250 due to the electrical wire being positioned within the electrical wire receiving space S. In other words, the biasing spring 270 removes any displacement of the lever 210 from its first position that would otherwise be created due to the presence of the electrical with in the electrical wire receiving space S.

In use, the biasing spring 270 may bias the lever 210 to the first position. Thus arranged, in use, the lever 210 may be moved from the first position to the second position against the biasing force applied by the biasing spring 270. In the second position, an electrical wire receiving space S is created or enlarged to enable a user to insert the electrical wire into the wire terminal 200 (e.g., in the second position, the electrical wire receiving space S may be enlarged a sufficient amount so that the electrical wire can be freely inserted into the electrical wire receiving space S without undue interference or resistance). In one embodiment, at least a portion of the clamp spring 250 is moved away from the contact 130 thereby creating or enlarging the electrical wire receiving space S for the electrical wire to be inserted when the lever 210 is in the second position. The biasing spring 270 ensures, or at least minimizes, the likelihood that the lever 210 can move to the second position inadvertently during, for example, installation of the wiring device 100 into a wall box, which may otherwise cause the electrical wire to free itself from the wiring device 100. In addition, the biasing spring 270 may assist with providing increased retention force to maintain the electrical wire within the electrical wire receiving space S (e.g., in the first position, with the electrical wire positioned within the electrical wire receiving space S, the biasing spring 270 may provide increased retention force on the wire against the contact 130).

The biasing spring 270 may have any suitable form and/or configuration to bias the lever 210 to the first position. For example, referring to FIGS. 4, 5, and 10, the biasing spring 270 may include a first arm, leg, or segment 272, a second arm, leg, or segment 274, and a third arm, leg or segment 276 (terms arm, leg, and segment used interchangeably herein without the intent to limit or distinguish). As illustrated, in one embodiment, the second arm 274 may be coupled to the first and third arms 272, 276. In addition, as illustrated, the first and third arms 272, 276 may extend from the respective ends of the second arm 274. Thus arranged, a space 278 is defined between the first and third arms 272, 276. In use, the biasing spring 270 may be coupled to the housing 110. Alternatively, the biasing spring 270 may be coupled to the contact 130 by, for example, positioning or clipping the contact 130 within the space 278 defined by the first and third arms 272, 276. Thus arranged, the biasing spring 270 may be directly coupled to, or in direct contact with, the contact 130.

In addition, as illustrated, in use, a second end or portion 273 (FIG. 10) of the first arm 272 (e.g., the end or portion opposite the end coupled to the second arm 274) is arranged and configured to contact the lever 210 to exert a force to bias the lever 210 to the first position. For example, in one embodiment, the second end of portion of the first arm 272 may contact a lower portion of the lever 210 to bias the lever 210 away from the contact 130. Thus, in use, the biasing spring 270 is arranged and configured to bias the lever 210 to the first position.

Figure 11A:
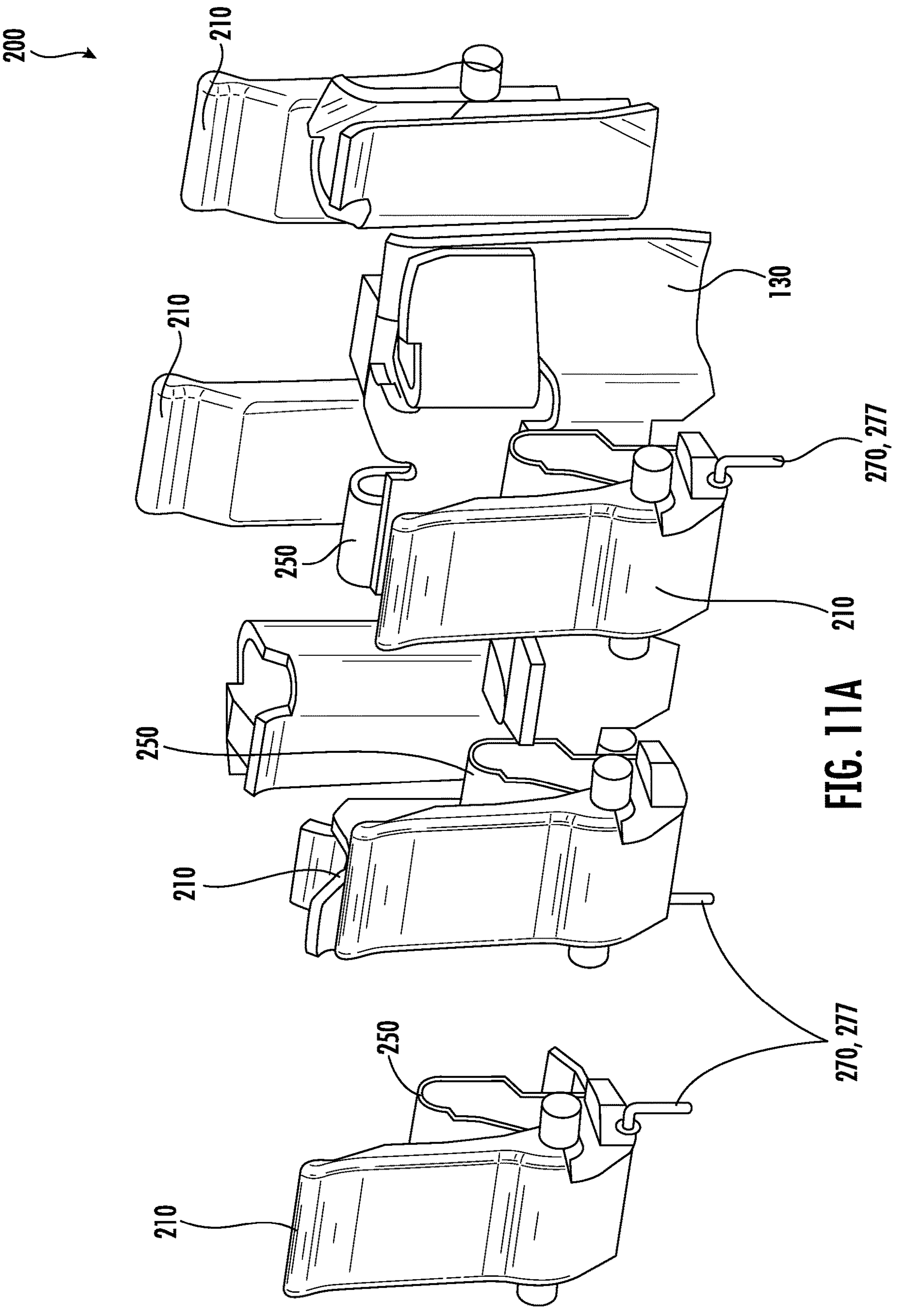
FIGS. 11A-11D illustrate various views of an alternate embodiment of a biasing spring in accordance with one or more features of the present disclosure.
Figure 11B:
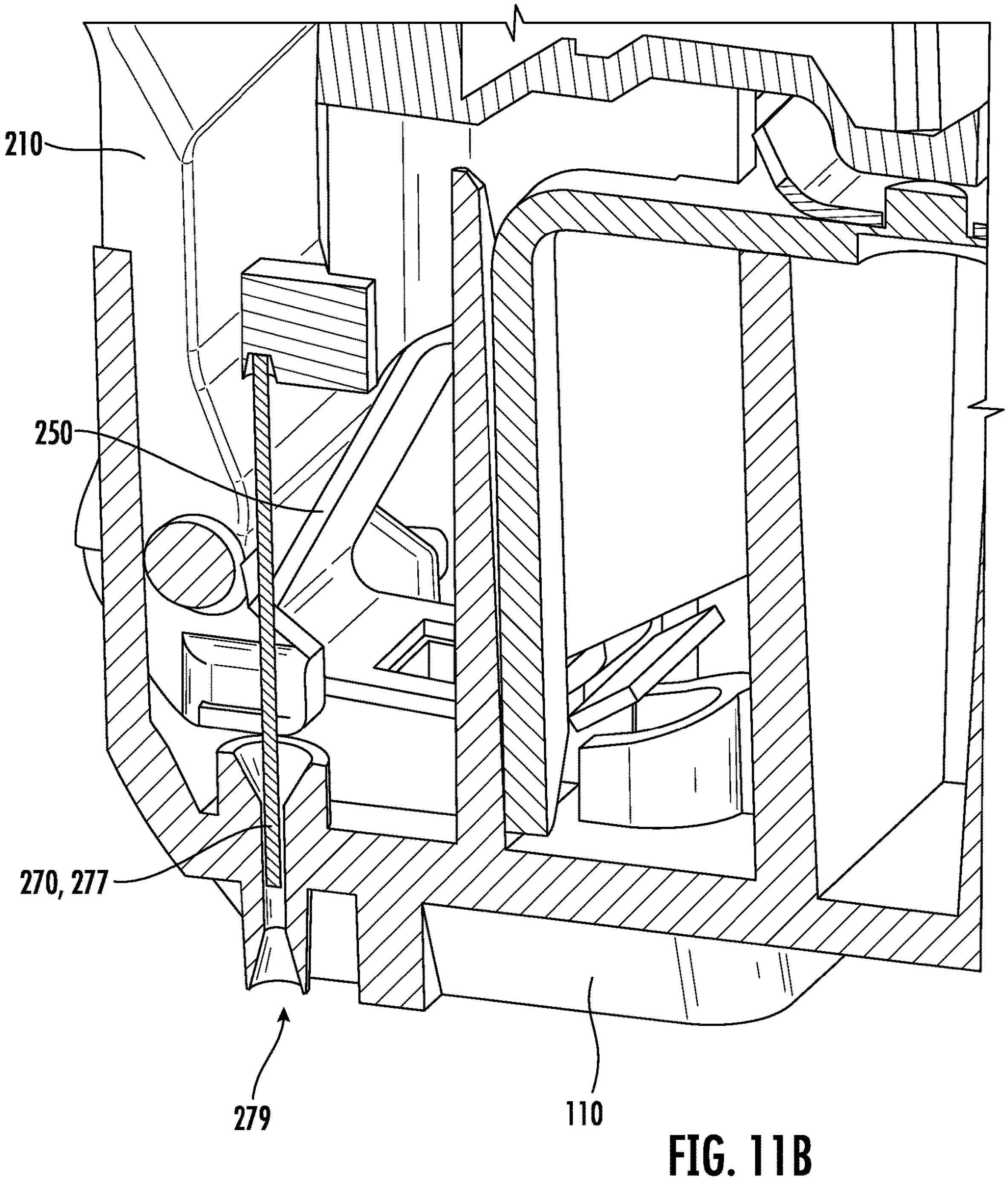
Figure 11C:
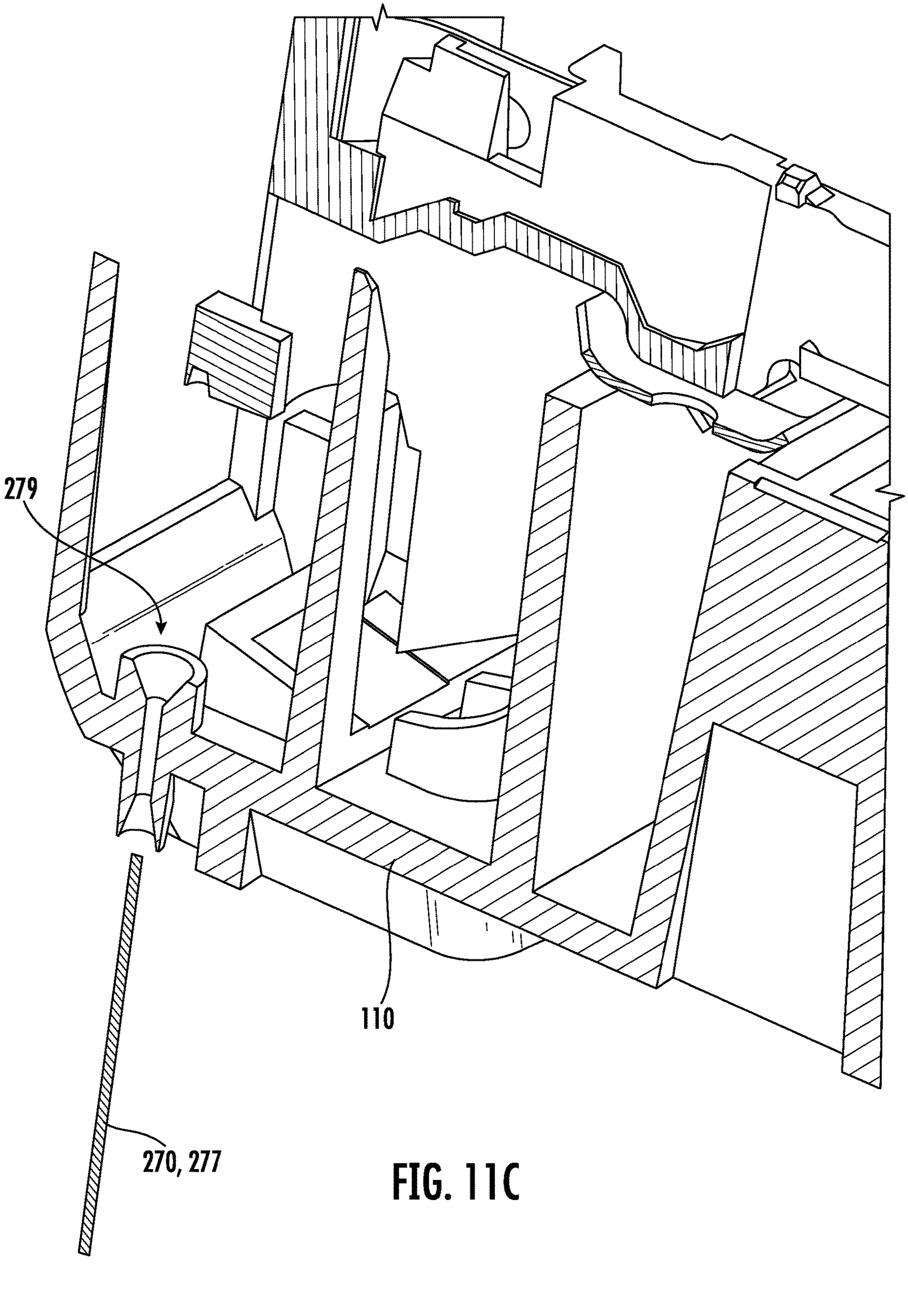
Figure 11D:
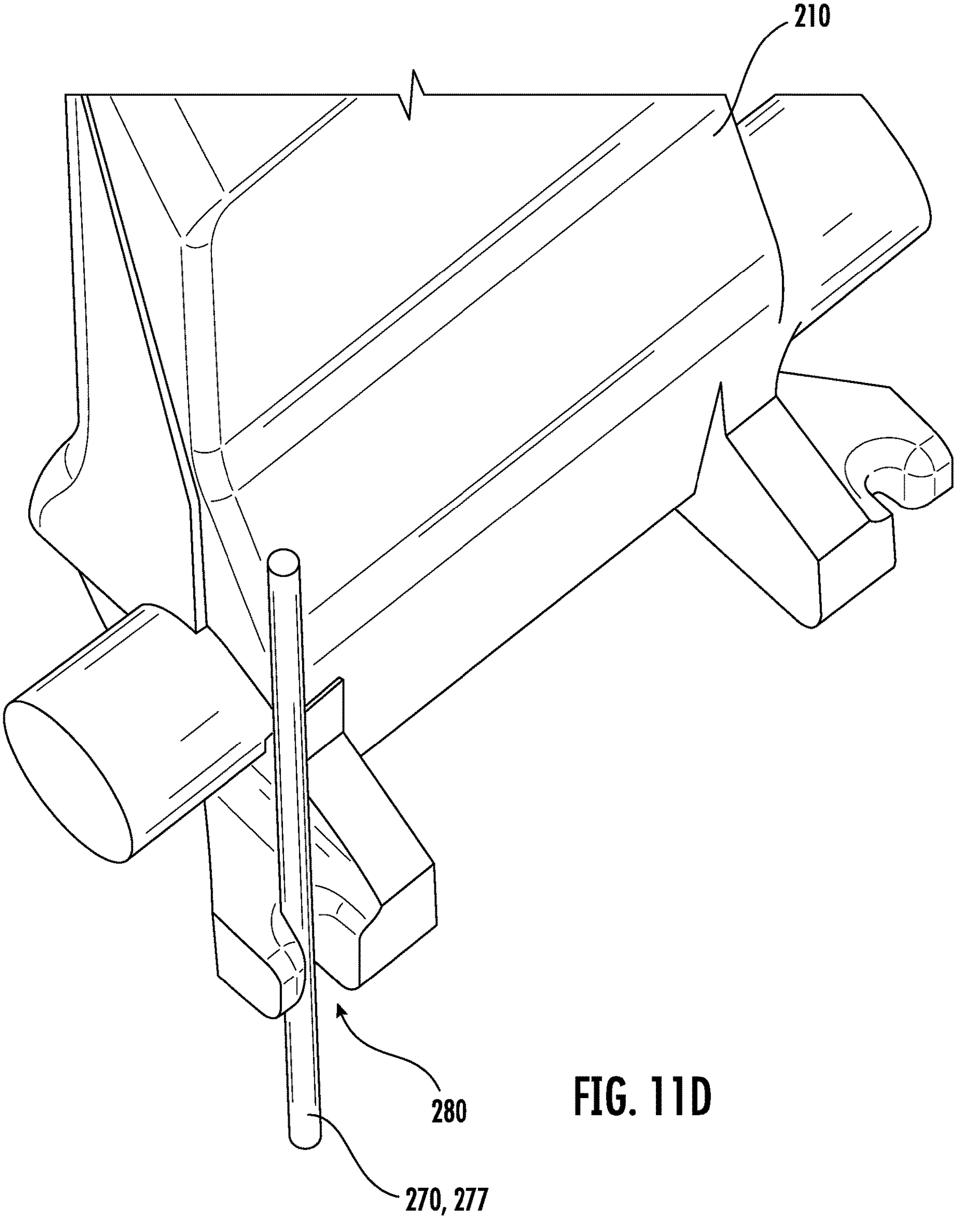

Alternatively, the biasing spring 270 may be provided in alternate forms. For example, referring to FIGS. 11A-11D, the biasing spring 270 may be in the form of a pin or pin spring. In one embodiment, as illustrated, the pin 277 may be positioned or coupled to the rear housing portion 112 and the front housing portion 114 of the wiring device 100, for example, a first end of the pin may be coupled to the front housing portion or a tamper-resistant mechanism if one is provided while the second end of the pin 277 may be coupled to the rear housing portion 112 of the housing 110. In one embodiment, as best illustrated in FIGS. 11B and 11C, the pin 277 may be inserted through an aperture 279 formed in the rear surface 116 of the housing 110. Once properly inserted, the aperture 279 formed in the rear surface 116 of the housing 110 may be closed over via a secondary process thereby trapping the pin 277 between bearing surfaces (e.g., between the front and rear housing portions of the wiring device 100). For example, in one embodiment, a plug can be inserted (e.g., snap-fitted) into the aperture 279 formed in the rear surface 116 of the housing 110. In addition, an intermediate portion or segment of the pin 277 may be coupled to the lever 210. For example, as best illustrated in FIG. 11D, the lever 210 may include a groove 280 formed therein, the groove 280 being arranged and configured to receive the intermediate portion or segment of the pin 277. In use, the pin 277 is arranged and configured to bias the lever 210 to the first position. For example, in one embodiment, with the pin 277 positioned within the groove 280 formed in the lever 210, a preload (e.g., the pin 277 being subjected to flexion) may be created on the lever 210 which biases or tends to rotate the lever 210 to the first position.

As previously mentioned, in accordance with one or more features of the present disclosure, the wiring device 100 may also include a retention element 300 for restraining a portion of the electrical wire near its free end once it has been inserted into the housing 110 of the wiring device 100 (e.g., to restrain a portion of the electrical wire within the housing). That is, the wiring device 100 may include a secondary, retention element or a second point of contact for gripping, engaging, holding, or contacting the electrical wire upon entry into the aperture 118 formed in the rear surface 116 of the housing 110. As will be appreciated by one of ordinary skill in the art, the electrical wire may include conductors (e.g., copper) and insulation (e.g., plastic) surrounding the conductors, in use, the retention element may be arranged and configure to contact either the conductor or the insulation.

Figure 12A:
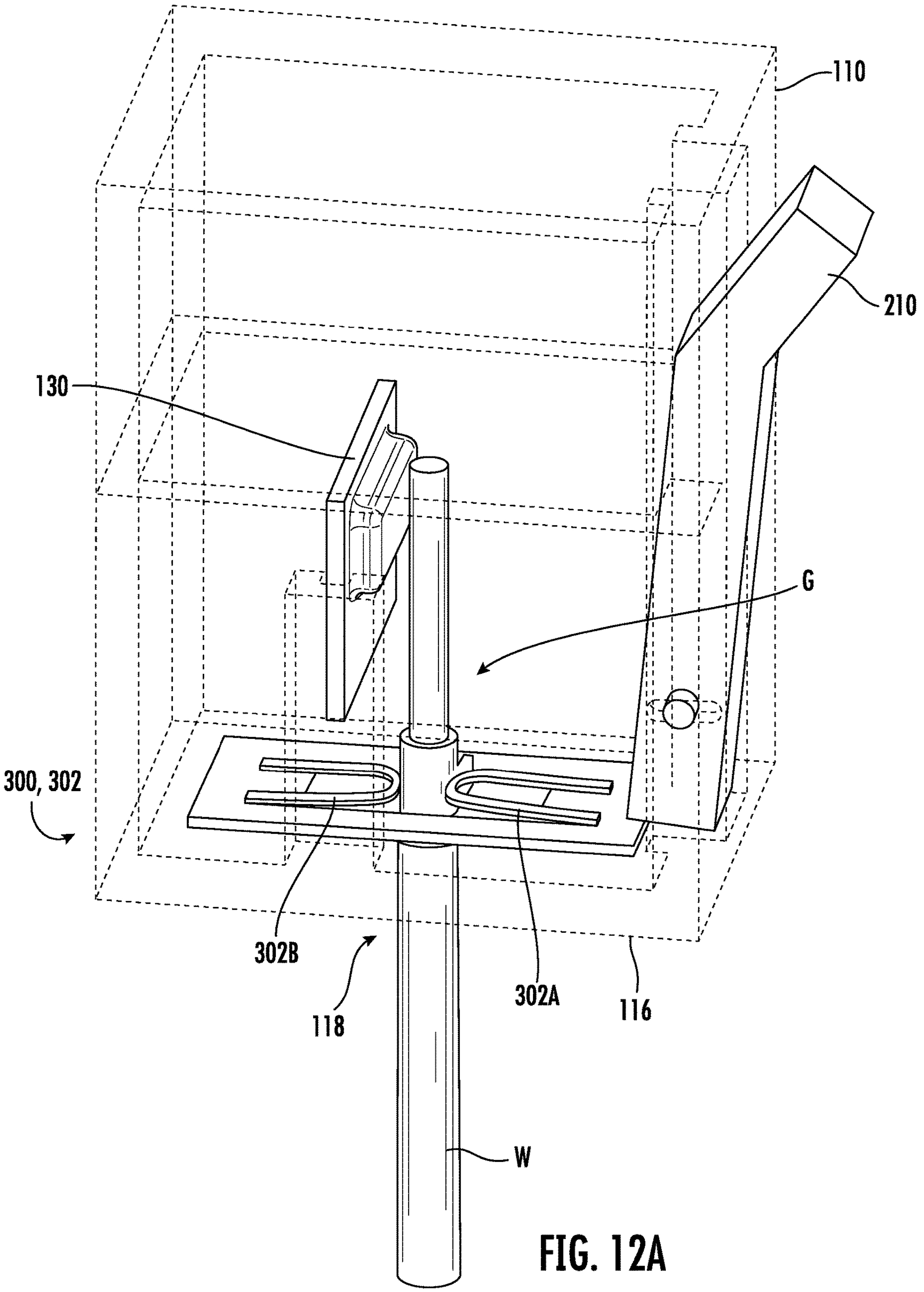
FIGS. 12A and 12B illustrate various views of an embodiment of a retention element in accordance with one or more features of the present disclosure.
Figure 12B:
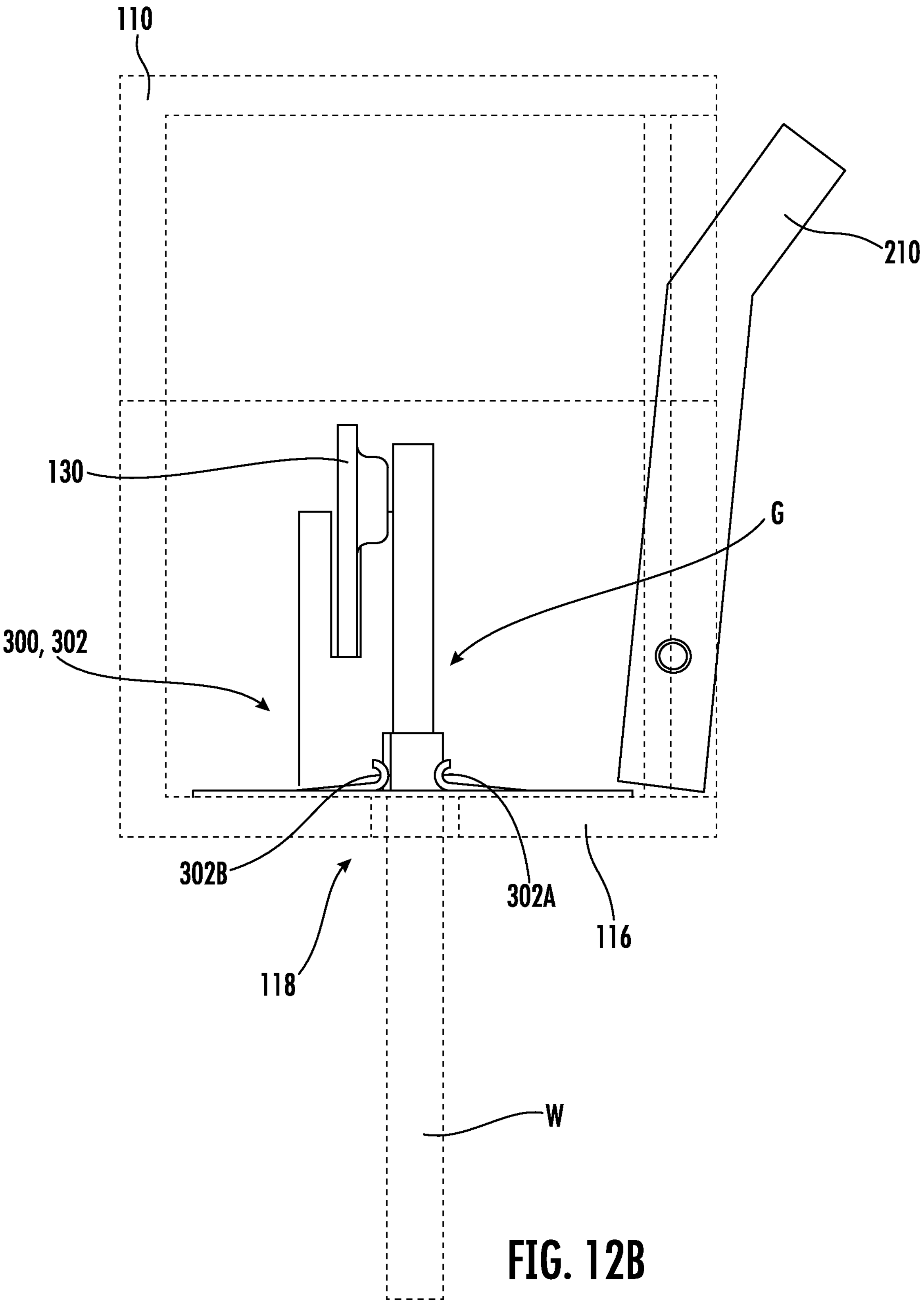

For example, referring to FIGS. 12A and 12B, in one embodiment, the retention element 300 may be provided in the form of a flexible member or clip 302. As illustrated, in one embodiment, the clip 302 may be positioned proximate the aperture 118 formed in the rear surface 116 of the housing 110 so that, in use, when the electrical wire W is inserted into the aperture 118 formed in the rear surface 116 of the housing 110, the clip 302 is arranged and configured to grip the electrical wire W (or the electrical wire's insulation) to further secure the electrical wire W within the housing 110 (e.g., the clip 302 holds the electrical wire W inside of the housing 110). In one embodiment, the clip 302 may be mounted to, or integrated with, the housing 110. The clip 302 may include first and second segments or portions 302A, 302B positioned on diametric sides of the aperture 118 formed in the rear surface 116 of the housing 110, however this is but one configuration and the clip 302 may include more or less segments or portions. Thus arranged, in use, the clip 302 (e.g., first and second segments or portions 302A, 302B) is arranged and configured to flex away from the rear surface 116 of the housing 110 during insertion of the electrical wire W into the aperture 118 formed in the rear surface 116 of the housing 110. Once the electrical wire W has been inserted into the aperture 118 formed in the rear surface 116 of the housing 110, the clip 302 (e.g., first and second segments or portions 302A, 302B) is arranged and configured to exert a compressive force against the electrical wire W, thus holding the electrical wire W within the housing 110. When an electrical wire W is not inserted into the wiring device 100, there is a gap G between the ends of the first and second segments 302A, 302B and the gap NN is aligned with the aperture 118. The clip 302 may be manufactured from any suitable material now know or hereafter developed. In use, when used in combination with one of the levers as described herein, the clamp spring will force the electrical wire W into contact with the contact 130.

Figure 13:
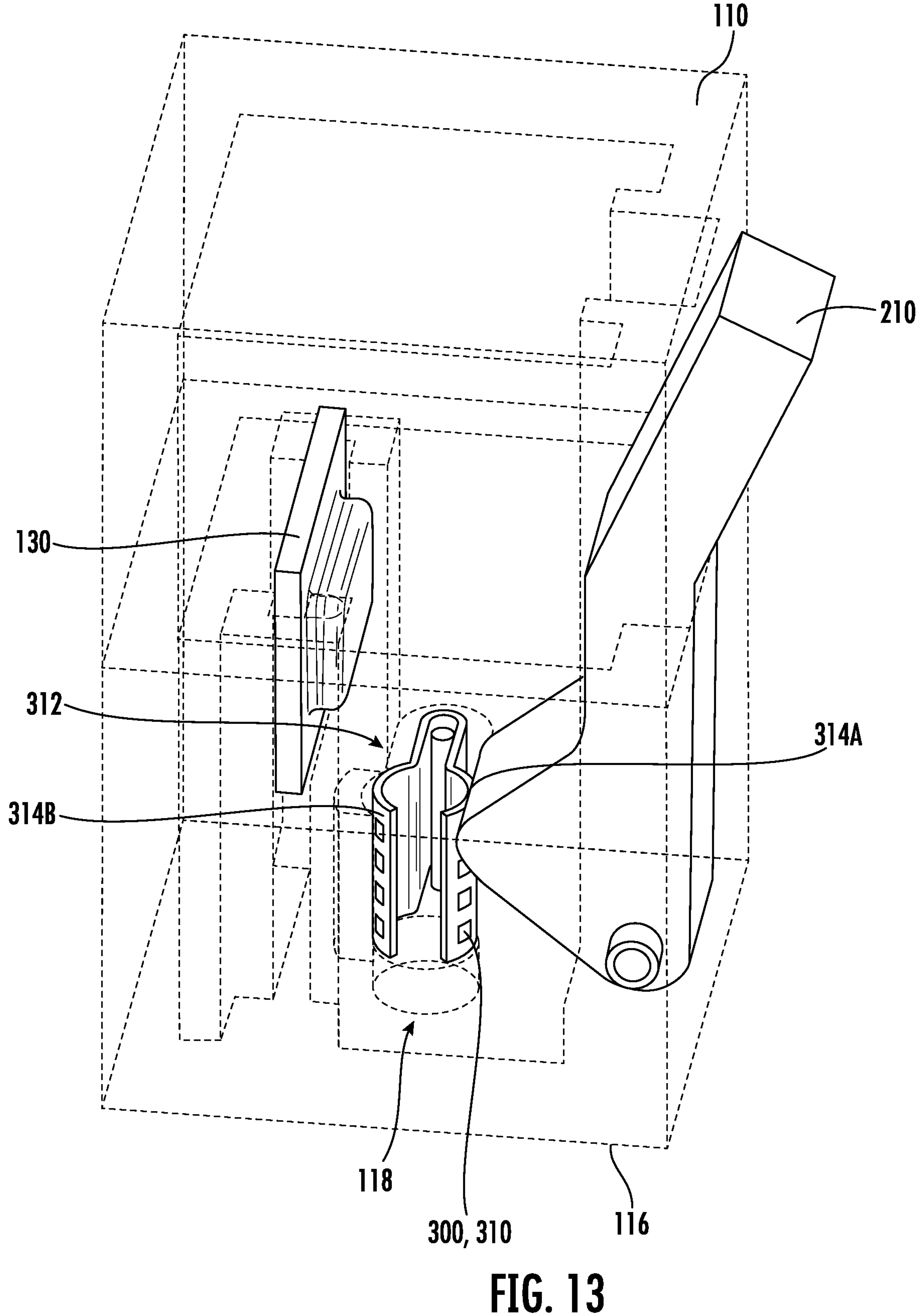
FIG. 13 illustrates a perspective view of an alternate embodiment of a retention element in accordance with one or more features of the present disclosure.

Alternatively, the retention element 300 for restraining a portion of the electrical wire near its free end once it has been positioned within or entered the housing 110 of the wiring device 100 may be take on other suitable forms or configurations. For example, referring to FIG. 13, the retention element 300 may be provided in the form of a collar or clamshell-like element 310. As illustrated, the collar 310 may be installed in the housing 110 proximate the aperture 118 formed in the rear surface 116 of the housing 110 so that, in use, with the lever 210 in the second positioned, the electrical wire can be inserted into the aperture 118 formed in the rear surface 116 of the housing 110 and into and through an opening 312 formed in the collar 310. Thereafter, with the electrical wire positioned within the aperture 118 formed in the rear surface 116 of the housing 110, the lever 210 may be moved to the first position, which causes the lever 210 to bias or compress the collar 310 against the electrical wire and thus causes the collar 310 to grip the electrical wire to secure the electrical wire to the housing 110 (e.g., the collar 310 holds the electrical wire inside of the housing 110). That is, the collar 310 is biased closed when the lever 210 is in the first position.

In one embodiment, as illustrated, the collar 310 may include first and second segments or portions 314A, 314B defining an opening 312 therebetween. In use, the first and second segments or portions 314A, 314B may be hingeably coupled together so that they can be moved towards and/or away from each other to enable the opening 312 to increase and/or decrease in size so that the electrical wire can be inserted therein, and once inserted, compressed. In one embodiment, the first and second segments or portions 314A, 314B may be biased to the opened position to increase the size of the opening 312 therebetween. Thus arranged, in use, the electrical wire may be inserted into the aperture 118 formed in the rear surface 116 of the housing 110 and into and through the opening 312 formed in the collar 310. Once the electrical wire has been inserted, the lever 210 may be moved to the first position causing the lever 210 to contact the collar 310 thereby applying a compressive force onto the collar 310 causing the collar 310 to compress about the electrical wire causing the collar 310 to hold the electrical wire to secure the electrical wire within the housing 110 (e.g., the collar 310 holds the electrical wire inside of the housing 110). The collar 310 may be manufactured from any suitable material now known or hereafter developed. In use, when used in combination with one of the levers as described herein, the clamp spring will force the electrical wire into contact with the contact.

Figure 14:
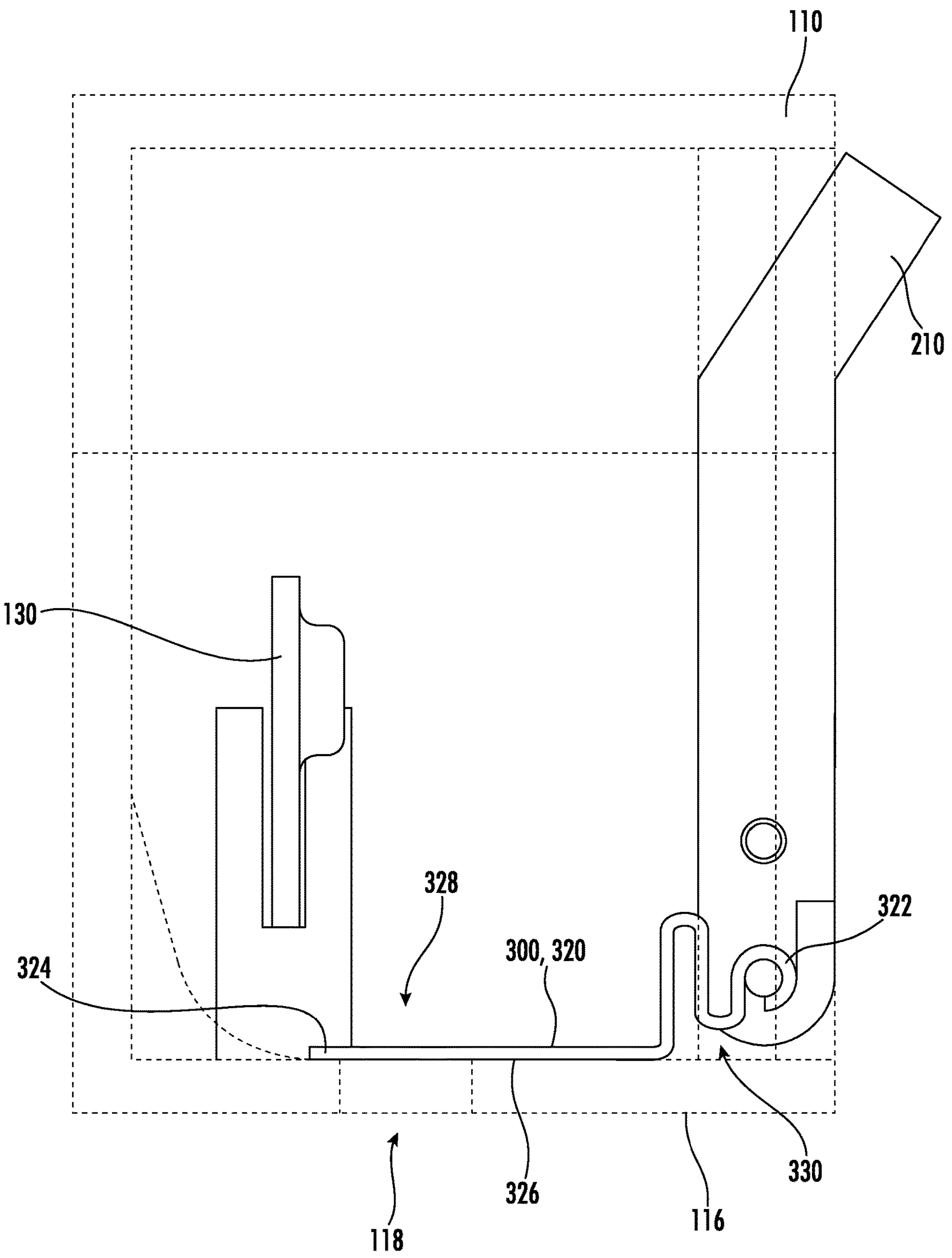
FIG. 14 illustrates a perspective view of an alternate embodiment of a retention element in accordance with one or more features of the present disclosure.

Alternatively, the retention element 300 for restraining a portion of the electrical wire near its free end once it has been positioned within or entered the housing 110 of the wiring device 100 may be in the form of a plate-like member 320. For example, referring to FIG. 14, the retention element 300 may be provided in the form of a sliding plate or component 320. As illustrated, in one embodiment, the plate 320 may include a first end 322, a second end 324, and an intermediate portion 326 extending between the first and second ends 322, 324. The intermediate portion 326 includes an opening 328. In use, the plate 320 is slidably positioned between a first position and a second position. In one embodiment, the first end 322 includes a coupling element for engaging the lever 210. In use, the coupling element may be any suitable element now known or hereafter developed including fasteners. As illustrated in one embodiment, the first end 322 of the plate 320 may include one or more hooks arranged and configured to engage one or more projections on the lever 210, or vice versa (e.g., the first end of the plate may include one or more projections and the lever may include one or more hooks). Thus arranged, the first end 322 of the plate 320 is coupled to the lever 210 using interconnecting hooks-and-projections, although this is but one configuration.

In use, with the plate 320 coupled to the lever 210, the plate 320 is slidably positioned between a first position and a second position. In use, with the lever 210 positioned in the second position, the opening 328 in the plate 320 is substantially aligned with the aperture 118 formed in the rear surface 116 of the housing 110 (e.g., the aperture 118 formed in the rear surface 116 of the housing 110 is substantially entirely exposed or available) to enable the electrical wire to be inserted through the aperture 118 formed in the rear surface 116 of the housing 110, through the opening 328 formed in the plate 320, and into contact with the contact 130. Once the electrical wire has been properly positioned, movement of the lever 210 from the second position to the first position, moves the plate 320 (e.g., plate 320 moves to the left as illustrated in the FIGS.) so that the opening 328 in the plate 320 is only partially aligned with the aperture 118 formed in the rear surface 116 of the housing 110. Thus arranged, movement of the lever 210 to the first position applies a force to the wire to hold it in place. In one embodiment, as illustrated, the plate 320 may incorporate a spring like element 330 to enable variability and/or adjustment to the amount of force used to contact the electrical wire. Thus arranged, the plate incorporates built in compliancy.

Thus arranged, in accordance with one or more features of the present disclosure, the wire terminal securing couples an electrical wire to a contact in a wiring device without the need for additional tools such as, for example, screwdrivers. In use, in one embodiment, the levers rotate about a pivot point, between first position and second position. With the levers positioned in the second position, the clamp spring is moved or pushed into an open position to facilitate insertion of an electrical wire into the housing via an aperture formed in the rear surface of the housing. Thereafter, the lever can be moved to the first position causing the clamp spring to clamp against the inserted electrical wire and securely connecting the wire against the contact. When no wire is present within the device and the lever is moved into the first position, the clamp spring may be oriented such that it would be unable to receive and/or secure a wire. If the lever is opened while a wire is inserted into the housing, the wire may be removed or replaced.

In use, the clamp spring may secure wires of different guages and/or construction (e.g., solid vs stranded wires and/or wires up to 12 guage or a range of guages). For example, the electrical wire receiving space S may be arranged and configured to receive a plurality different wire gauges and types. For example, the electrical wire receiving space S may be arranged and configured to receive a 12-gauge wire, a 14-gauge wire, etc. In addition, the electrical wire receiving space S may be arranged and configured to receive stranded wire, solid wire, etc.

As illustrated, in various embodiments, the clamp spring may be monolithically formed. Alternatively, however, the clamp spring may be manufactured from multiple segments, which may be assembled together. Similarly, the biasing spring may be monolithically formed. Alternatively, however, the biasing spring may be manufactured from multiple segments, which may be assembled together.

Additionally, and/or alternatively, in accordance with one or more features of the present disclosure and as previously mentioned, the electrical wiring device can be any suitable wiring device now known or hereafter developed. For example, the wiring device can be duplex, decorator style, etc. Moreover, in use, the wiring device may include any suitable number of levers, which although shown and described as being vertically orientated (e.g., pivotable about a horizontal pivot), may be arranged and configured to pivot about a vertical pivot (e.g., horizontally orientated). In addition, and/or alternatively, the proximal end of the levers (e.g., portion of the levers opposite the pivot and which is arranged and configured to be grabbed by the user) are preferably arranged and configured so that when the levers are positioned in a closed position, the levers do not extend laterally beyond a perimeter of the device face. Thus arranged, the distance between the levers and the side of the electrical box is maximized.

Additionally, and/or alternatively, in accordance with one or more features of the present disclosure, the levers 210 may be color coded to assist the user with installation of the electrical wire. For example, in one embodiment, a first lever arranged and configured for a ground connection may be a first color such as, for example, green, a second lever arranged and configured for a neutral connection may be a second color such as, for example, white, a third lever arranged and configured for a common or phase connection may be a third color such as, for example, black, and a fourth lever arranged and configured for a traveler wire connection may be a fourth color such as, for example, red.

Figure 15A:
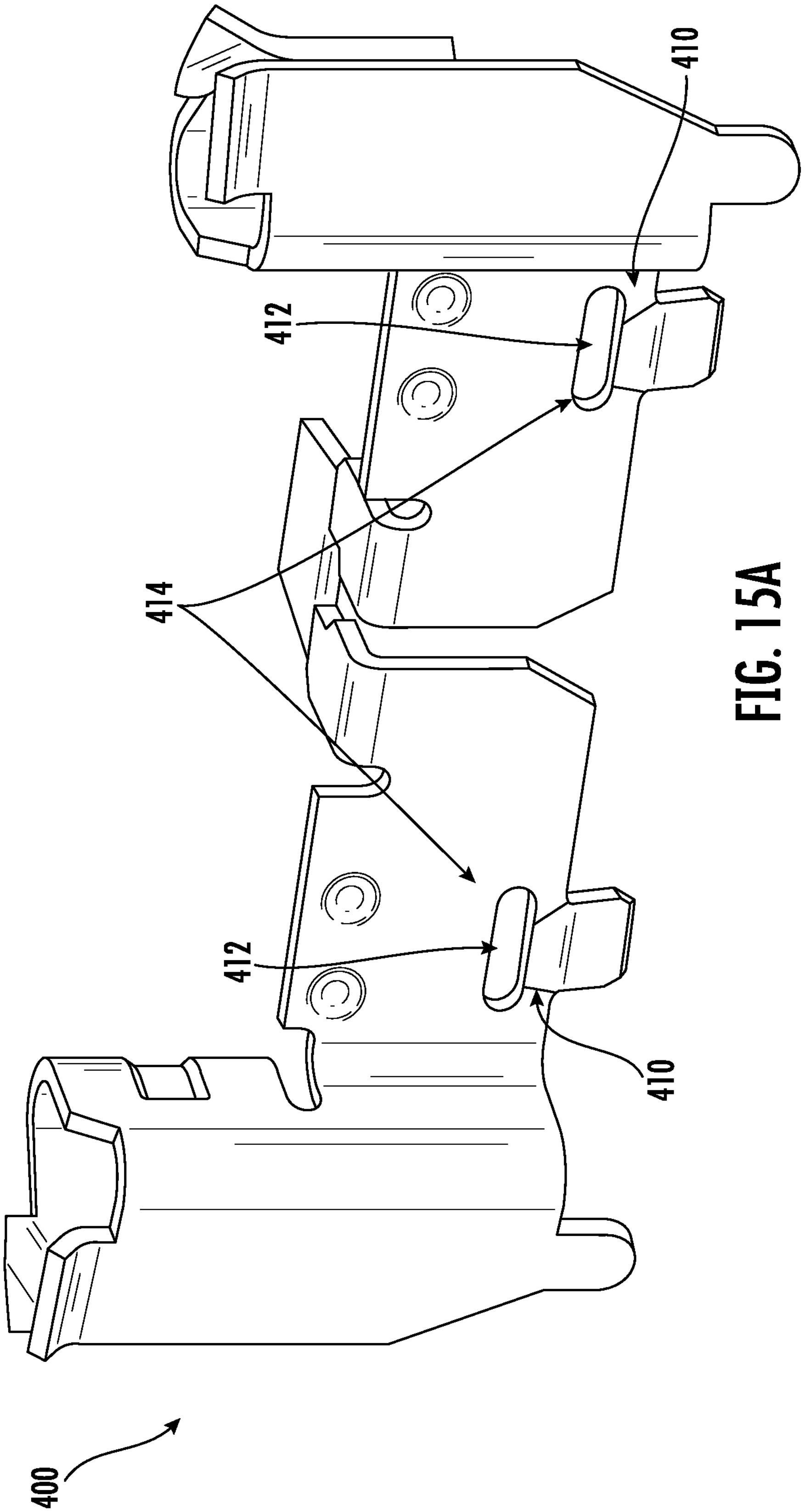
FIGS. 15A-16B illustrate various view of an alternate embodiment of a contact including a sharpened edge to provide increased pull-out resistance in accordance with one or more features of the present disclosure.

Additionally, and/or alternatively, in accordance with one or more features of the present disclosure that may be used in combination with any of the embodiments described herein, the contact may include a sharpened or sharp edge. That is, with reference to FIGS. 15A-15C, the contact 400 may include a projection or ledge 410 formed on the wire facing surface or side thereof. The projection or ledge 410 being arranged and configured to interact with an electrical wire W inserted into the wiring device. The projection or ledge 410 including a sharpened edge 412 for contacting and/or engaging the inserted electrical wire W. In use, the sharpened edge 412 formed on the projection or ledge 410 is arranged and configured to engage or bite into the inserted electrical wire W to provide increased pressure on the wire/contact interface against the force supplied by the clamp spring thereby enabling an improved electrical connection. In addition, in use, the sharpened edge 412 is arranged and configured to engage or bite into the inserted electrical wire W to increase pull-out performance (e.g., the leading surface on the projection or ledge is sharpened or sharp so that, in use, the sharpened edge bites into the inserted electrical wire W to provide increased resistance (e.g., additional retention force) against the electrical wire W being pulled out of the wiring device).

Figure 15C:
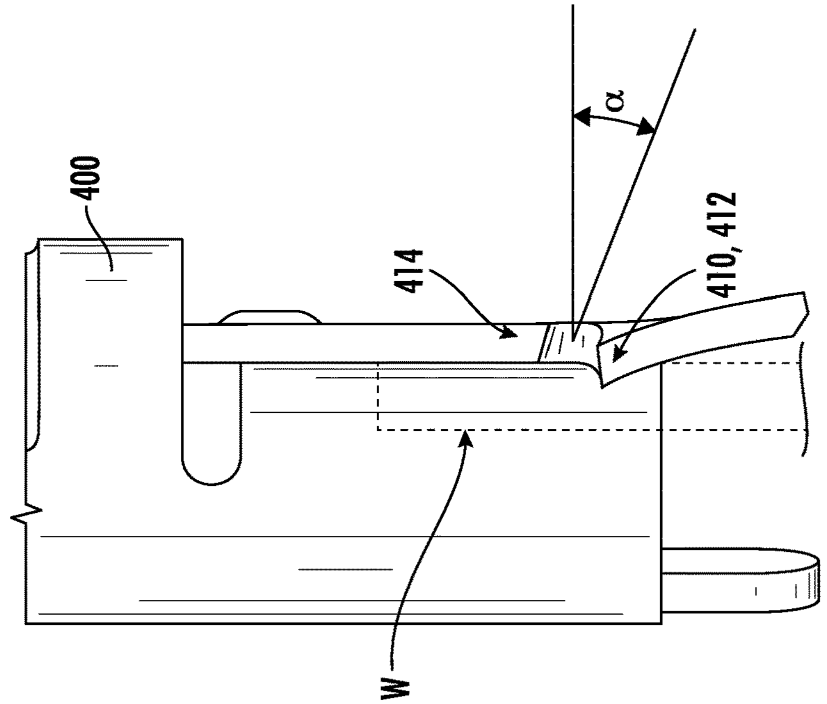
Figure 15B:
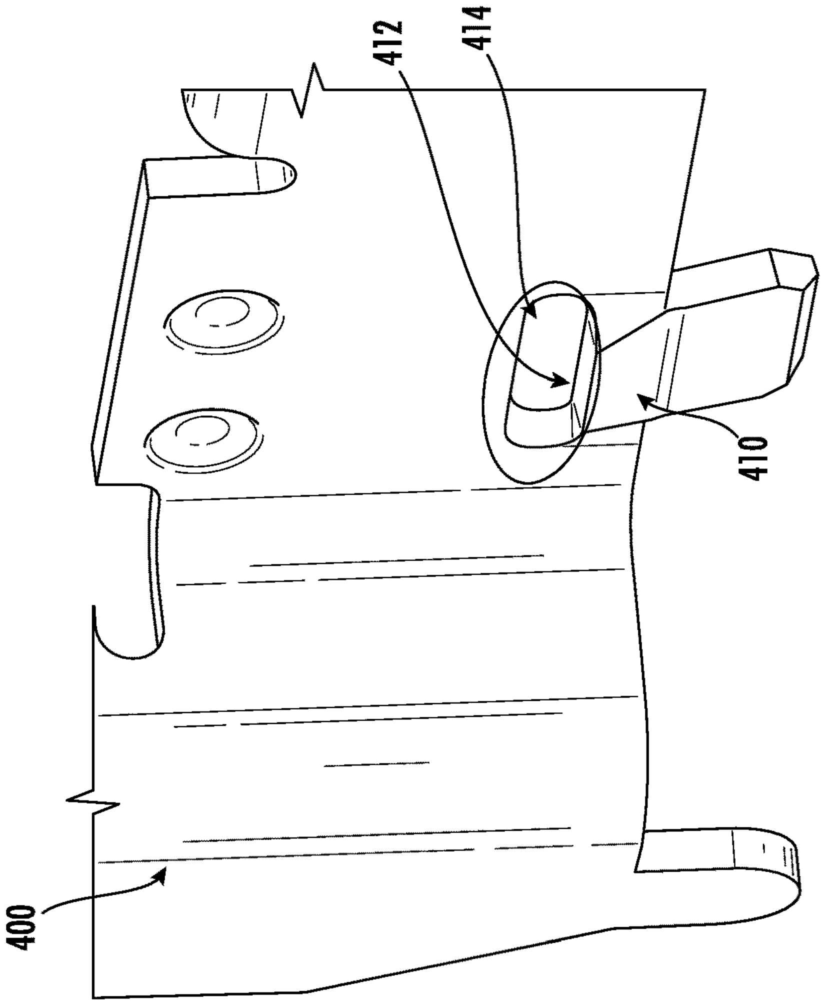

In accordance with one or more features of the present disclosure, the sharpened edge 412 formed on the projection or ledge 410 may be formed by a punched hole 414. That is, during manufacturing, a hole 414 is punched through the contact 400 thereby creating the sharpened edge 412 on the projection or ledge 410. In addition, during manufacturing, the material from the punched hole 414 may be twisted out from the terminal plane. In one preferred embodiment, the punched hole 414 through the contact 400 is angled by an angle α, (FIG. 15C) which may be approximately fifteen (15) degrees relative to a plane perpendicular to the electrical wire W (or terminal plane). Thus arranged, when the material from the punched hole 414 of the contact 400 is twisted out of the plane, the surface created by the punch hole 414 is substantially perpendicular to the inserted electrical wire W as best illustrated in FIG. 15C (as opposed to creating a lead-out angle if the cut was not done at a fifteen (15) degree angle). In addition, by punching the hole 414 to create the sharpened edge 412 concerns over the life-span of the die conventionally used to create the sharpened edge wearing away over time are alleviated.

Figure 16B:
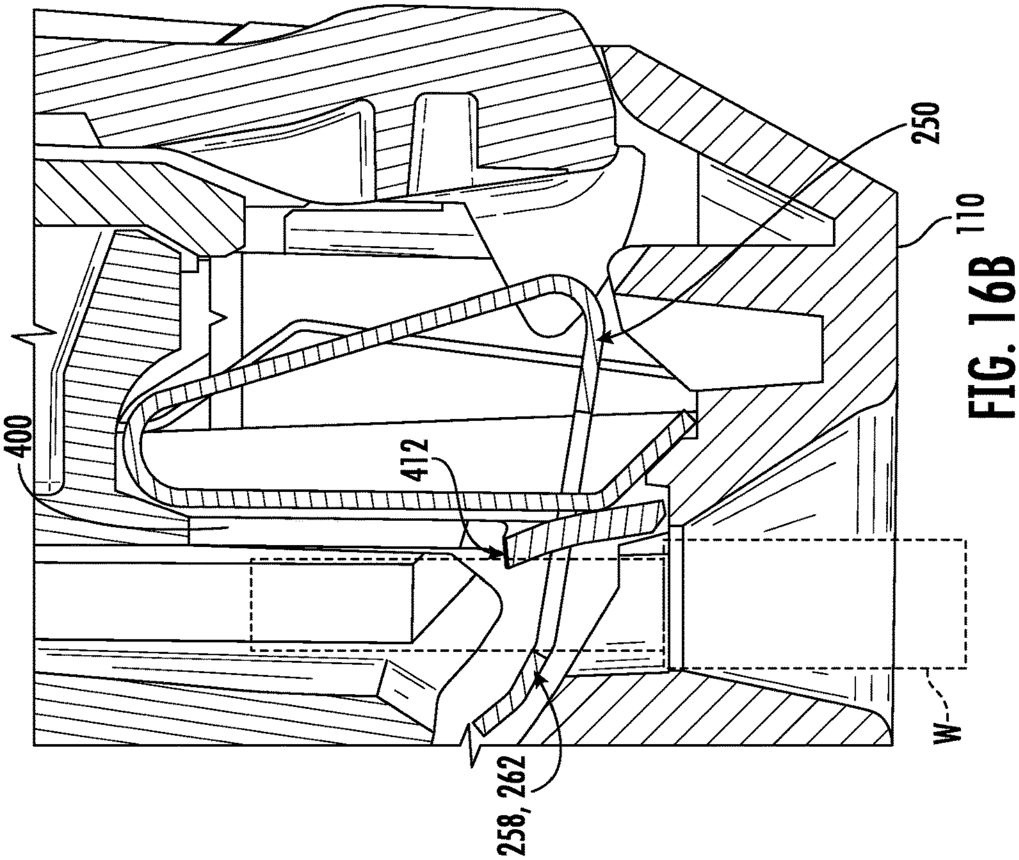
Figure 16A:
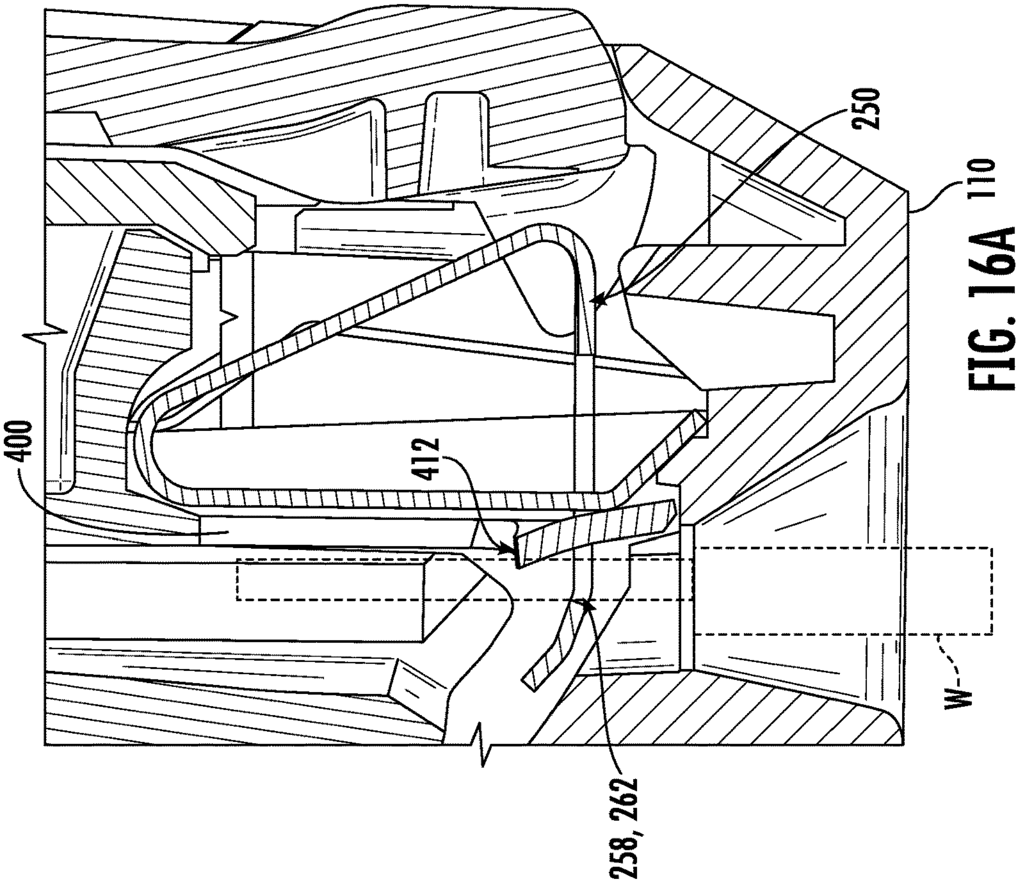

In use, with reference to FIGS. 16A and 16B, when the clamp spring such as, when the sharpened stab formed along the aperture 258 of the wire contacting surface 262 of clamp spring 250, applies pressure to the outer surface of the inserted electrical wire W and begins to penetrate the outer surface of the electrical wire W, a substantially equal pressure can be applied to the opposite side of the electrical wire W by the sharpened edge 412 formed on the projection or ledge 410 formed on the contact 400. Thus arranged, in use, by providing a sharpened edge 412 on the contact side, an increase in pull-out resistance due to the added penetration from the sharpened edge 412 formed on the contact 400 has been found.

The foregoing description has broad application. While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments. Rather these embodiments should be considered as illustrative and not restrictive in character. All changes and modifications that come within the spirit of the invention are to be considered within the scope of the disclosure. The present disclosure should be given the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art. Unless otherwise defined, all technical terms used herein have the same meaning as commonly understood by one of ordinary skill in the art to which the disclosure belongs.

Directional terms such as top, bottom, superior, inferior, medial, lateral, anterior, posterior, proximal, distal, upper, lower, upward, downward, left, right, longitudinal, front, back, above, below, vertical, horizontal, radial, axial, clockwise, and counterclockwise) and the like may have been used herein. Such directional references are only used for identification purposes to aid the reader's understanding of the present disclosure. For example, the term "distal" may refer to the end farthest away from the medical professional/operator when introducing a device into a patient, while the term "proximal" may refer to the end closest to the medical professional when introducing a device into a patient. Such directional references do not necessarily create limitations, particularly as to the position, orientation, or use of this disclosure. As such, directional references should not be limited to specific coordinate orientations, distances, or sizes, but are used to describe relative positions referencing particular embodiments. Such terms are not generally limiting to the scope of the claims made herein. Any embodiment or feature of any section, portion, or any other component shown or particularly described in relation to various embodiments of similar sections, portions, or components herein may be interchangeably applied to any other similar embodiment or feature shown or described herein.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. Furthermore, references to "one embodiment" of the present disclosure are not intended to be interpreted as excluding the existence of additional embodiments that also incorporate the recited features.

In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

As used herein, an element or step recited in the singular and proceeded with the word "a" or "an" should be understood as not excluding plural elements or steps, unless such exclusion is explicitly recited. It will be further understood that the terms "comprises" and/or "comprising," or "includes" and/or "including" when used herein, specify the presence of stated features, regions, steps, elements and/or components, but do not preclude the presence or addition of one or more other features, regions, integers, steps, operations, elements, components and/or groups thereof.

The phrases "at least one", "one or more", and "and/or", as used herein, are open-ended expressions that are both conjunctive and disjunctive in operation. The terms "a" (or "an"), "one or more" and "at least one" can be used interchangeably herein.

Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

The foregoing discussion has been presented for purposes of illustration and description and is not intended to limit the disclosure to the form or forms disclosed herein. For example, various features of the disclosure are grouped together in one or more embodiments or configurations for the purpose of streamlining the disclosure. However, it should be understood that various features of the certain embodiments or configurations of the disclosure may be combined in alternate embodiments or configurations. Moreover, the following claims are hereby incorporated into this Detailed Description by this reference, with each claim standing on its own as a separate embodiment of the present disclosure.

What is claimed is:

1. A wiring device, comprising:

a housing;

an electrical contact disposed at least partially within the housing, the electrical contact arranged and configured to accept a plug blade; and a wire terminal arranged and configured to secure a line-voltage electrical wire to the electrical contact, the wire terminal including:

a lever arranged and configured to move between a first position and a second position;

a first spring positioned adjacent to the electrical contact, the first spring defining an electrical wire receiving space; and a biasing element arranged and configured to apply a force onto the lever to maintain the lever in the first position;

wherein, in the second position, the lever engages the first spring to enlarge the electrical wire receiving space to receive the electrical wire, and, in the first position, the first spring biases the electrical wire against the electrical contact to securely retain the electrical wire within the electrical wire receiving space and in contact with the electrical contact.

2. The wiring device of claim 1, wherein the biasing element is a biasing spring.

3. The wiring device of claim 2, wherein the biasing spring is arranged and configured to contact a portion of the lever such that a biasing force is applied to the lever to bias the lever to the first position.

4. The wiring device of claim 3, wherein the biasing spring includes a first segment, a second segment, and a third segment, the second segment coupling the first segment to the third segment, the biasing spring defining a space between the first and third segments.

5. The wiring device of claim 4, wherein a portion of the first segment is arranged and configured to contact the lever.

6. The wiring device of claim 1, wherein the biasing element is a longitudinal pin operatively coupled to the lever to bias the lever to the first position.

7. The wiring device of claim 6, wherein the lever includes a groove sized and configured to engage an intermediate portion of the pin.

8. The wiring device of claim 1, further comprising a secondary retention element arranged and configured to contact a portion of the electrical wire near a free end of the electrical wire once the electrical wire has been inserted into the housing.

9. The wiring device of claim 8, wherein the secondary retention element contacts an insulated portion of the electrical wire near the free end of the electrical wire once the electrical wire has been inserted into the housing.

10. The wiring device of claim 8, wherein the secondary retention element comprises a flexible clip positioned proximate an aperture formed in a rear surface of the housing, the flexible clip being arranged and configured to flex to enable the electrical wire to be inserted into the aperture formed in the rear surface of the housing, the clip being arranged and configured to grip the electrical wire to at least partially secure the electrical wire within the housing.

11. The wiring device of claim 10, wherein the flexible clip includes first and second segments positioned on diametric sides of the aperture formed in the rear surface of the housing, the first and second segments being arranged and configured to exert a compressive force against the electrical wire.

12. The wiring device of claim 11, wherein the first and second segments of the flexible clip exert the compressive force against an insulated portion of the electrical wire.

13. The wiring device of claim 8, wherein the secondary retention element comprises a collar positioned proximate an aperture formed in a rear surface of the housing, the collar including first and second segments hingeably coupled to each other, the first and second segments movable between a first position and a second position, the second position including an increased diameter to facilitate insertion of the electrical wire, the first and second segments compressing against the electrical wire in the first position.

14. The wiring device of claim 13, wherein movement of the lever from the second position to the first position moves the collar from its second position to its first position.

15. The wiring device of claim 8, wherein the secondary retention element comprises a plate moveable between a first position and a second position, the plate positioned proximate an aperture formed in a rear surface of the housing, the plate including an opening therein, in the second position, the opening formed in the plate is aligned with the aperture formed in the rear surface of the housing to enable the electrical wire to be inserted therethrough, in the first position, the opening in the plate is moved relative to the aperture in the rear surface of the housing to hold the electrical wire within the housing.

16. The wiring device of claim 15, wherein the plate is coupled to the lever so that movement of the lever from the second position to the first position moves the plate from its second position to its first position.

17. The wiring device of claim 1, wherein the lever is pivotable between the first and second positions.

18. The wiring device of claim 1, wherein the first spring includes a sharp edge arranged and configured to contact the electrical wire to provide additional retention force in maintaining the electrical wire in the electrical wire receiving space.

19. The wiring device of claim 1, wherein the first spring includes a first leg, a second leg, and a third leg, the first leg including an aperture formed therein, a portion of the third leg being positioned within the aperture formed in the first leg.

20. The wiring device of claim 19, wherein the second leg couples an end of the first leg to an end of the third leg.

21. The wiring device of claim 19, wherein, in use, movement of the lever from the first position to the second position applies a force onto the first spring causing the first and second legs to move relative to the third leg resulting in the electrical wire receiving space increasing in size.

22. The wiring device of claim 21, wherein the electrical wire receiving space is defined by a wire contacting surface formed along the aperture of the first leg and a wire facing surface of the third leg.

23. The wiring device of claim 19, wherein the aperture formed in the first leg of the first spring is positioned adjacent to an aperture formed in a rear surface of the housing.

24. The wiring device of claim 19, wherein the lever includes a bearing surface, movement of the lever from the first position to the second position causes the bearing surface formed on the lever to contact the first leg of the first spring, which moves the first leg of the first spring relative to the third leg of the first spring thereby enlarging the electrical wire receiving space.

25. The wiring device of claim 1, wherein the wiring device is a line-voltage wiring device arranged and configured to be inserted into a wall box.

26. The wiring device of claim 25, wherein the line-voltage wiring device is selected from one of an electrical receptacle, ground fault circuit interrupters, and arc fault circuit interrupters.

27. The wiring device of claim 1, wherein the electrical contact includes a ledge having a sharpened edge arranged and configured to contact the electrical wire.

28. A wiring device, comprising:

a housing;

an electrical contact disposed at least partially within the housing; and a wire terminal arranged and configured to secure a line-voltage electrical wire to the electrical contact, the wire terminal including:

a lever arranged and configured to move between a first position and a second position;

a first spring positioned adjacent to the electrical contact, the first spring defining an electrical wire receiving space; and a biasing element arranged and configured to apply a force onto the lever to maintain the lever in the first position;

wherein, in the second position, the lever engages the first spring to enlarge the electrical wire receiving space to receive the electrical wire, and, in the first position, the first spring biases the electrical wire against the electrical contact to securely retain the electrical wire within the electrical wire receiving space and in contact with the electrical contact.

29. A wiring device, comprising:

a housing;

an electrical contact disposed at least partially within the housing; and a wire terminal arranged and configured to secure a line-voltage electrical wire to the electrical contact, the wire terminal including:

a lever arranged and configured to move between a first position and a second position;

a first spring positioned adjacent to the electrical contact, the first spring defining an electrical wire receiving space;

a biasing spring arranged and configured to apply a force onto the lever to maintain the lever in the first position; and a secondary retention element arranged and configured to contact a portion of the electrical wire near a free end of the electrical wire once the electrical wire has been inserted into the housing;

wherein, in the second position, the lever engages the first spring to enlarge the electrical wire receiving space to receive the electrical wire, and, in the first position, the first spring biases the electrical wire against the electrical contact to securely retain the electrical wire within the electrical wire receiving space and in contact with the electrical contact.

30. The wiring device of claim 1, wherein when the lever is in the first position, the biasing element is further configured to remove slack and maintain the lever in the first position, the slack being caused by insertion of the electrical wire into the electrical wire receiving space.

31. The wiring device of claim 28, wherein when the lever is in the first position, the biasing element is further configured to remove slack and maintain the lever in the first position, the slack being caused by insertion of the electrical wire into the electrical wire receiving space.

32. The wiring device of claim 29, wherein when the lever is in the first position, the biasing spring is further configured to remove slack and maintain the lever in the first position, the slack being caused by insertion of the electrical wire into the electrical wire receiving space.

* * * * *